(12) United States Patent
Kurita

(10) Patent No.: US 10,338,433 B2
(45) Date of Patent: Jul. 2, 2019

(54) LIGHT-EMITTING APPARATUS AND DISPLAY APPARATUS

(71) Applicant: CANON KABUSHIKI KAISHA, Tokyo (JP)

(72) Inventor: Masanao Kurita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/988,261

(22) Filed: May 24, 2018

(65) Prior Publication Data

US 2018/0341151 A1 Nov. 29, 2018

(30) Foreign Application Priority Data

May 25, 2017 (JP) ................................ 2017-103323

(51) Int. Cl.
| | |
|---|---|
| *F21V 9/30* | (2018.01) |
| *G02F 1/017* | (2006.01) |
| *F21Y 105/10* | (2016.01) |
| *F21Y 115/10* | (2016.01) |
| *G02F 1/1335* | (2006.01) |

(52) U.S. Cl.
CPC .......... *G02F 1/133603* (2013.01); *F21V 9/30* (2018.02); *G02F 1/017* (2013.01); *G02F 1/133605* (2013.01); *G02F 1/133606* (2013.01); *G02F 1/133608* (2013.01); *F21Y 2105/10* (2016.08); *F21Y 2115/10* (2016.08); *G02F 1/133621* (2013.01); *G02F 2001/01791* (2013.01); *G02F 2001/133601* (2013.01); *G02F 2001/133614* (2013.01)

(58) Field of Classification Search
CPC ........... G02F 1/133603; G02F 1/33608; G02F 1/017; G02F 1/133606; G02F 1/133605; G02F 1/133621; G02F 2001/133614; G02F 2001/133601; G02F 2001/01791; F21V 9/30; F21Y 2115/10; F21Y 2105/10
See application file for complete search history.

(56) References Cited

U.S. PATENT DOCUMENTS

2019/0088828 A1* 3/2019 Nakamura ............ H01L 33/502

FOREIGN PATENT DOCUMENTS

| JP | 2006-148051 A | 6/2006 |
|---|---|---|
| JP | 2013-544018 A | 12/2013 |
| JP | 2014-044828 A | 3/2014 |

* cited by examiner

*Primary Examiner* — Joseph L Williams
*Assistant Examiner* — Jose M Diaz
(74) *Attorney, Agent, or Firm* — Cowan, Liebowitz & Latman, P.C.

(57) ABSTRACT

A light-emitting apparatus includes: a light-source unit configured to emit light of a first color; a sheet member containing a conversion member configured to emit light of the first color and light of a second color, according to incidence of the light emitted from the light-source unit; a bottom-surface member; a side-surface member; and an upper-surface member, wherein the sheet member emits the light of the second color by a light amount corresponding to a length of a path where the incident light of the first color passes through the sheet member, a space including the light-source unit and the conversion member is formed by the bottom-surface member, the side-surface member, and the upper-surface member, and a first opening connecting an inside and an outside of the space is provided at a position, on the upper-surface member, which does not face the light-source unit.

19 Claims, 30 Drawing Sheets

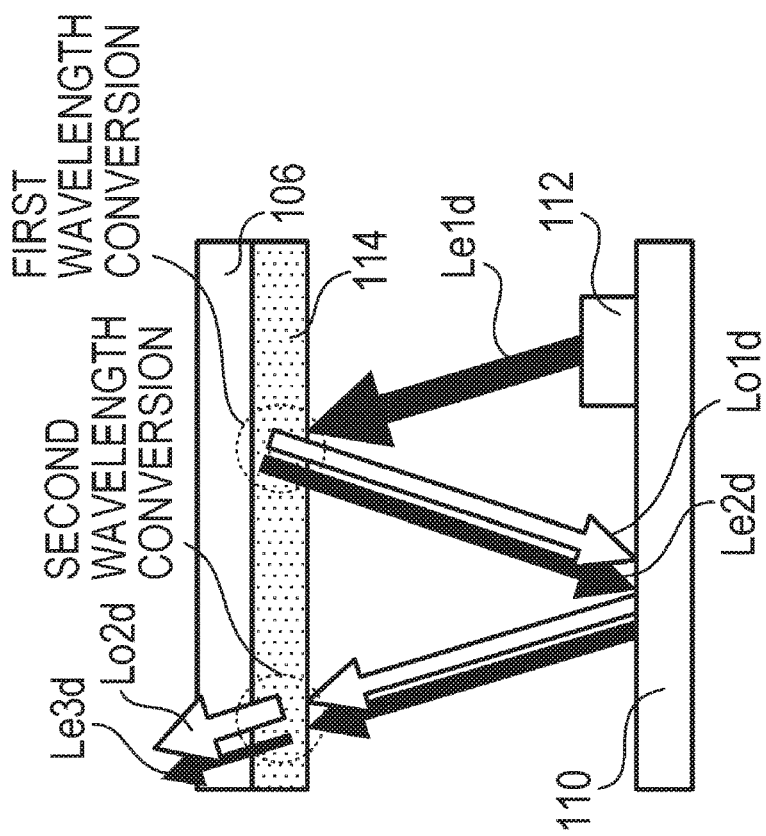
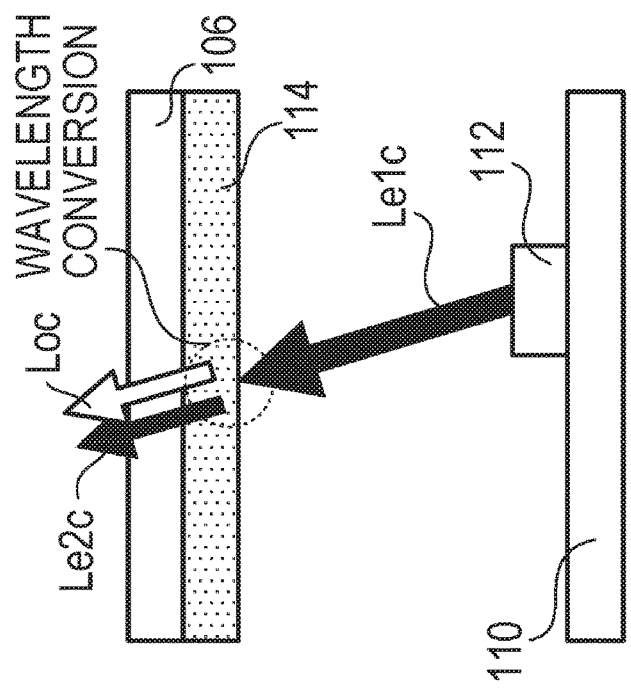

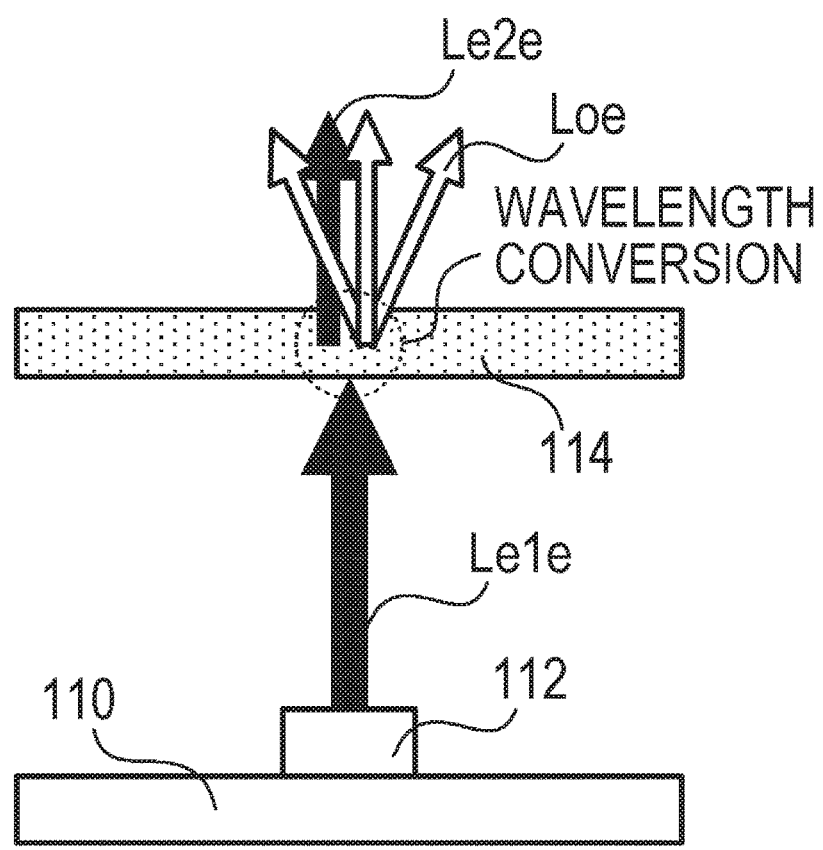

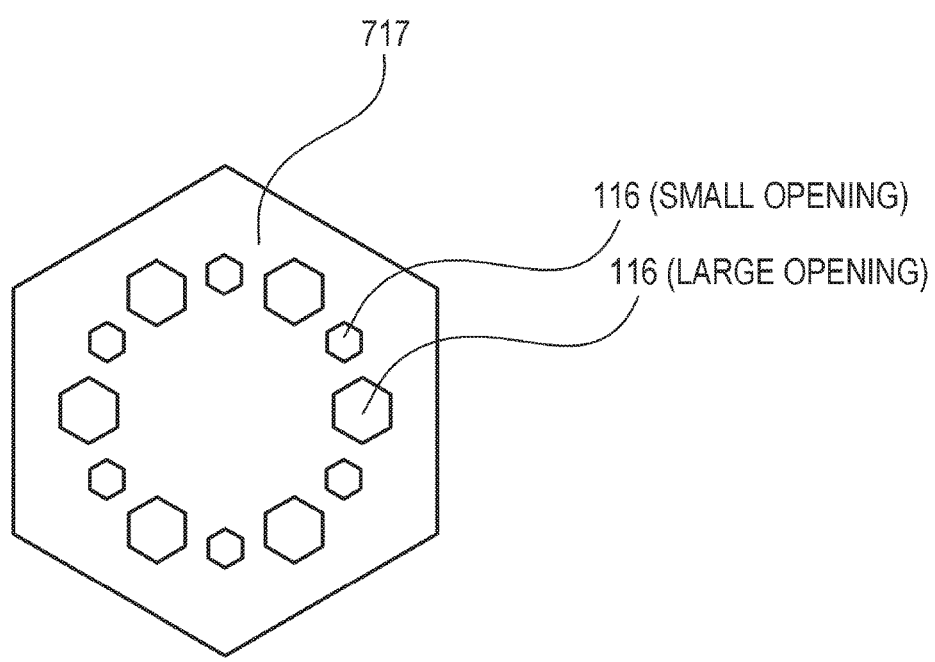

2

LIGHT-EMITTING APPARATUS AND DISPLAY APPARATUS

BACKGROUND OF THE INVENTION

Field of the Invention

The present invention relates to a light-emitting apparatus and a display apparatus.

Description of the Related Art

Color image display apparatuses including a color liquid-crystal panel having a color filter and a light-emitting apparatus (backlight apparatus) irradiating white light onto the back surface of the color liquid-crystal panel have been known. Conventionally, fluorescent lamps such as cold cathode fluorescent lamps (CCFLs) have been mainly used as the light sources of light-emitting apparatuses. In recent years, however, light-emitting diodes (LEDs) excellent in power consumption, service life, color reproducibility, and environmental loads have been used as the light sources of light-emitting apparatuses.

Light-emitting apparatuses (LED backlight apparatuses) including LEDs as light sources have been known. For example, a LED backlight apparatus disclosed in Japanese Patent Application Laid-open No. 2014-44828 includes a plurality of light-emitting blocks, and each of the light-emitting blocks includes at least one LED. Further, the light-emitting brightness of each of the light-emitting blocks is separately controlled.

The contrast ratio of a display image (image displayed on a screen) may be improved in such a way that the light-emitting brightness of light-emitting blocks irradiating light onto the low-brightness display region of the screen is decreased or the light-emitting brightness of light-emitting blocks irradiating the light onto the high-brightness display region of the screen is increased. The low-brightness display region represents a region in which a dark image is to be displayed, while the high-brightness display region represents a region in which a bright image is to be displayed. Such light-emitting brightness control of each of light-emitting blocks according to the features of an image is called "local dimming control." Further, local dimming control for increasing the display brightness (brightness on a screen) of a small region in which a bright image is to be displayed is called "high dynamic range (HDR) control." By the HDR control, it becomes possible to express sparkles, smooth gradation changes, or the like that have not been capable of being expressed.

As a technology for improving the color reproducibility of a display image, there has been proposed one using quantum dots in a light-emitting apparatus. A light-emitting apparatus including quantum dots is disclosed in, for example, Japanese Translation of PCT Application No. 2013-544018. The light-emitting apparatus disclosed in Japanese Translation of PCT Application No. 2013-544018 includes LEDs and a quantum dot sheet (conversion member). The quantum dot sheet is a sheet (film)-shaped member containing the quantum dots as a fluorescent body (fluorescent material). In the light-emitting apparatus disclosed in Japanese Translation of PCT Application No. 2013-544018, the LEDs emit blue light serving as excitation light, and the quantum dot sheet generates red light and green light each representing fluorescence according to the incidence of the blue light emitted from the LEDs to emit the red light, the green light, and the blue light. Since the fluorescence emitted from the quantum dots has high color purity, it becomes possible to expand the color gamut of a display image using the quantum dots.

SUMMARY OF THE INVENTION

However, when the local dimming control or the HDR control is performed using a conventional light-emitting apparatus including a conversion member, unintended color irregularities occur in light emitted from the light-emitting apparatus, a display image, or the like.

The present invention in its first aspect provides a light-emitting apparatus comprising:
  a light-source unit configured to emit light of a first color;
  a sheet member containing a conversion member configured to emit light of the first color and light of a second color that is different from the first color, according to incidence of the light emitted from the light-source unit;
  a bottom-surface member;
  a side-surface member; and
  an upper-surface member, wherein
  the sheet member emits the light of the second color by a light amount corresponding to a length of a path where the incident light of the first color passes through the sheet member,
  a space including the light-source unit and the conversion member is formed by the bottom-surface member, the side-surface member, and the upper-surface member, and
  a first opening connecting an inside and an outside of the space to each other is provided at a position, on the upper-surface member, which does not face the light-source unit.

The present invention in its second aspect provides a display apparatus comprising:
  a backlight unit including a light-source unit configured to emit light of a first color, a sheet member containing a conversion member configured to emit light of the first color and light of a second color that is different from the first color, according to incidence of the light emitted from the light-source unit, a bottom-surface member, a side-surface member, and an upper-surface member; and
  a display panel configured to display an image by transmitting the light of the first color and the light of the second color emitted from the backlight unit on the basis of input image data, wherein
  the sheet member emits the light of the second color by a light amount corresponding to a length of a path where the incident light of the first color passes through the sheet member,
  a space including the light-source unit and the conversion member is formed by the bottom-surface member, the side-surface member, and the upper-surface member, and
  a first opening connecting an inside and an outside of the space to each other is provided at a position, on the upper-surface member, which does not face the light-source unit.

Further features of the present invention will become apparent from the following description of exemplary embodiments with reference to the attached drawings.

BRIEF DESCRIPTION OF THE DRAWINGS

FIGS. 7A and 7B are schematic views each showing an example of the cross section of the light-emitting unit;

FIG. 8 is a schematic view showing an example of the cross section of the light-emitting unit;

FIG. 30 is a schematic view showing another arrangement example of the openings according to the third embodiment.

DESCRIPTION OF THE EMBODIMENTS

First Embodiment

Hereinafter, a description will be given of a first embodiment of the present invention.

A light-emitting apparatus according to the embodiment may be used in a display apparatus including a display panel that displays an image by transmitting light emitted from the light-emitting apparatus on the basis of input image data. For example, the light-emitting apparatus according to the embodiment may be used as a backlight unit of a liquid-crystal display apparatus having a liquid-crystal panel as a display panel. The light-emitting device according to the embodiment may also be used in a micro electro mechanical system (MEMS) shutter display apparatus including a MEMS shutter instead of liquid-crystal elements.

The light-emitting apparatus according to the embodiment may also be used in a display apparatus such as an advertisement sign apparatus and a sign display apparatus. The light-emitting apparatus according to the embodiment may also be used as an illumination apparatus such as a street lamp, interior illumination, and microscope illumination. A display apparatus according to the embodiment may be a color display apparatus (display apparatus capable of displaying a color image) or a monochrome display apparatus (display apparatus capable of displaying only a monochrome image).

Figure 1:
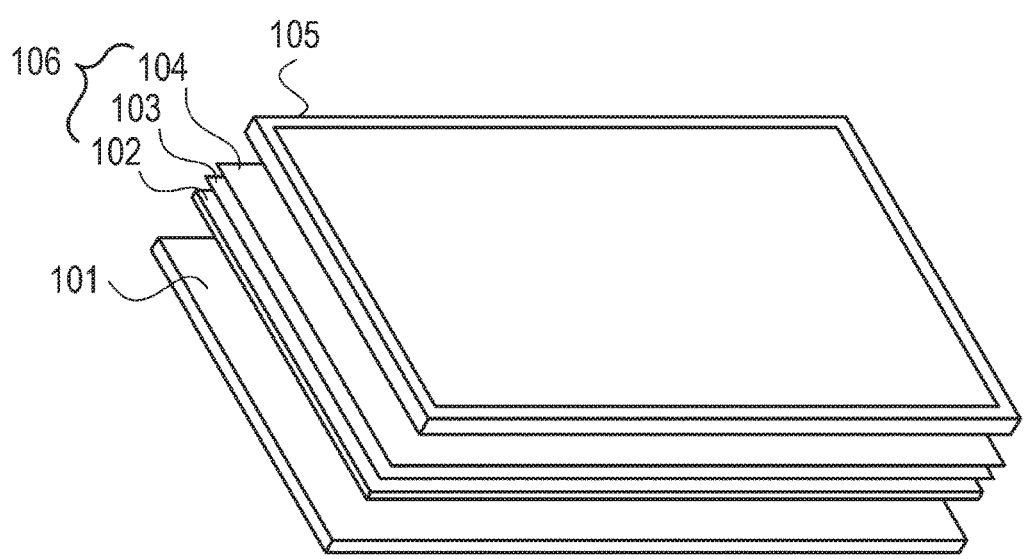
FIG. 1 is a schematic view showing a configuration example of a color display apparatus according to a first embodiment.

FIG. 1 is a schematic view showing a configuration example of a color display apparatus according to the embodiment. The color display apparatus according to the embodiment includes a backlight unit and a color liquid-crystal panel 105. The backlight unit includes a light-emitting unit 101 and an optical sheet 106. The backlight unit is provided on the side of the back surface of the color liquid-crystal panel 105 and irradiates light onto the back surface of the color liquid-crystal panel 105 provided on the side of its front surface.

The light-emitting unit 101 emits white light. The optical sheet 106 optically changes the white light emitted from the light-emitting unit 101. In the embodiment, the optical sheet 106 has a configuration in which a diffusion plate 102, a condensing sheet 103, and a reflective polarization film 104 are overlapped with each other. The diffusion plate 102 diffuses the white light emitted from the light-emitting unit 101 to cause the backlight unit to function as a surface light source. The condensing sheet 103 condenses the white light diffused by the diffusion plate 102 and made incident at various incident angles in the direction of its front surface (on the side of the color liquid-crystal panel 105) to improve front-surface brightness (brightness in the direction of the front surface). The reflective polarization film 104 efficiently polarizes the incident white light to improve the front-surface brightness.

Note that the optical sheet 106 may contain any member other than the plurality of optical members described above or may not contain any of the plurality of optical members described above. The optical sheet 106 may not be a part of the backlight unit. The optical sheet 106 may be a part of the color liquid-crystal panel 105. The optical sheet 106 and the color liquid-crystal panel 105 may be configured to be integrated with each other.

The backlight unit irradiates the white light onto the back surface of the color liquid-crystal panel 105. Specifically, the white light emitted from the light-emitting unit 101 and optically changed by the optical sheet 106 is irradiated onto the back surface of the color liquid-crystal panel 105.

The color liquid-crystal panel 105 displays an image on a screen by transmitting the white light emitted from the backlight unit on the basis of input image data. In the embodiment, the color liquid-crystal panel 105 includes a plurality of sets of liquid-crystal elements that transmit red light, liquid-crystal elements that transmit green light, and liquid-crystal elements that transmit blue light. The color liquid-crystal panel 105 controls the transmittance of each of the liquid-crystal elements on the basis of the input image data. Then, a color image is displayed on the screen when the white light emitted from the backlight unit passes through each of the liquid-crystal elements at the transmittance based on the input image data.

Figure 2:
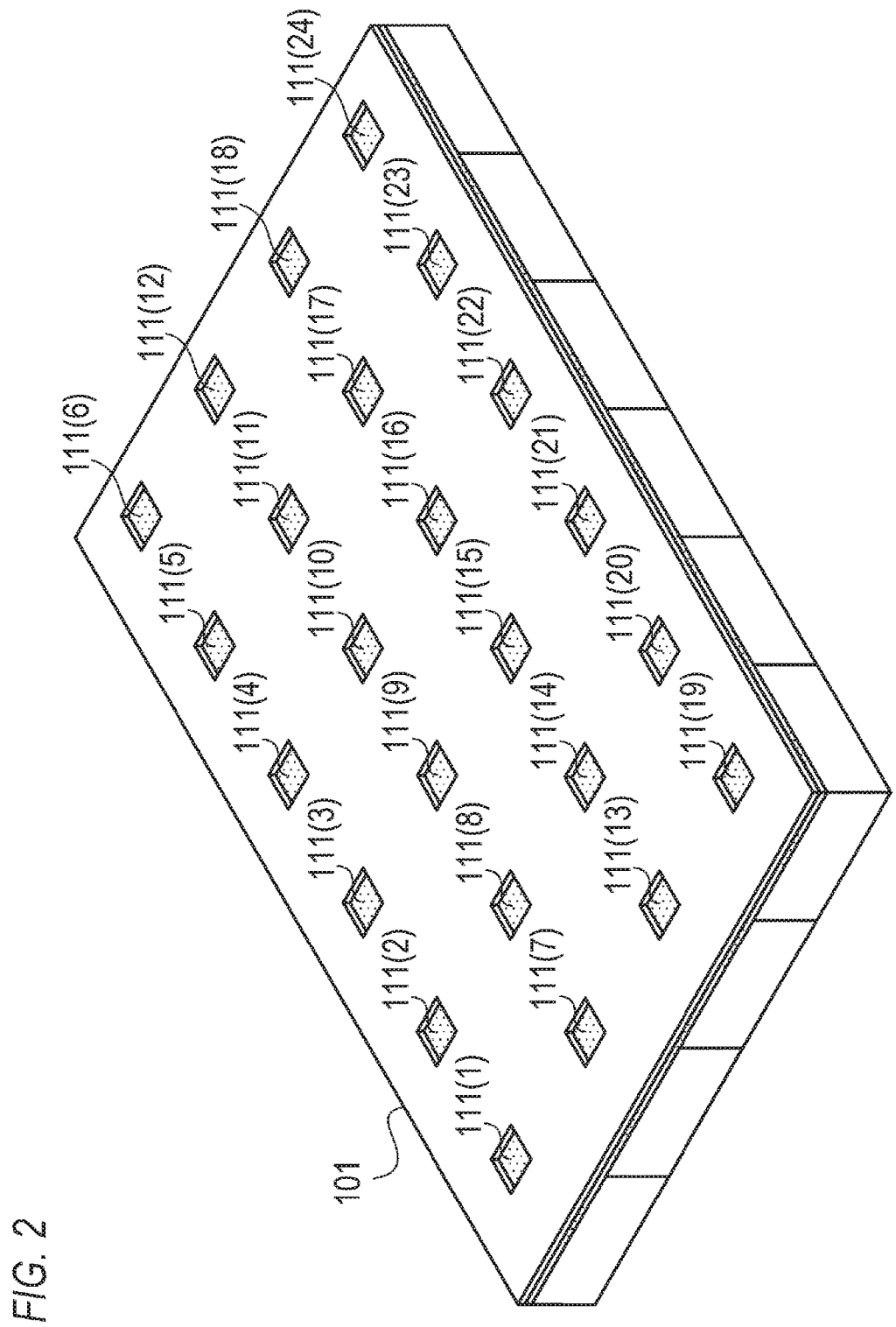
FIG. 2 is a schematic view showing a configuration example of a light-emitting unit according to the first embodiment.

FIG. 2 is a schematic view showing a configuration example of the light-emitting unit 101. The light-emitting unit 101 includes a plurality of light-emitting blocks 111. In the example of FIG. 2, the light-emitting unit 101 includes 24 light-emitting blocks 111 (four blocks in its vertical direction×six blocks in its horizontal direction). The light-emitting brightness of each of the light-emitting blocks 111 can be controlled individually. In FIG. 2, the x-th light-emitting block 111 is described as a "light-emitting block 111(x)." Note that in the following description, a direction from the back surface to the front surface of the light-emitting unit 101 will be assumed as a direction from the bottom side to the top side of the light-emitting unit 101. Note that the top-bottom direction of the light-emitting unit 101 may or may not correspond to a vertical direction (direction parallel to a gravity direction). For example, when the screen of the color liquid-crystal panel 105 is provided to be substantially parallel to the vertical direction, the top-bottom direction of the light-emitting unit 101 is a direction substantially perpendicular to the vertical direction. When the screen of the color liquid-crystal panel 105 is provided to be substantially perpendicular to the vertical direction, the top-bottom direction of the light-emitting unit 101 corresponds to the vertical direction.

Figure 3:
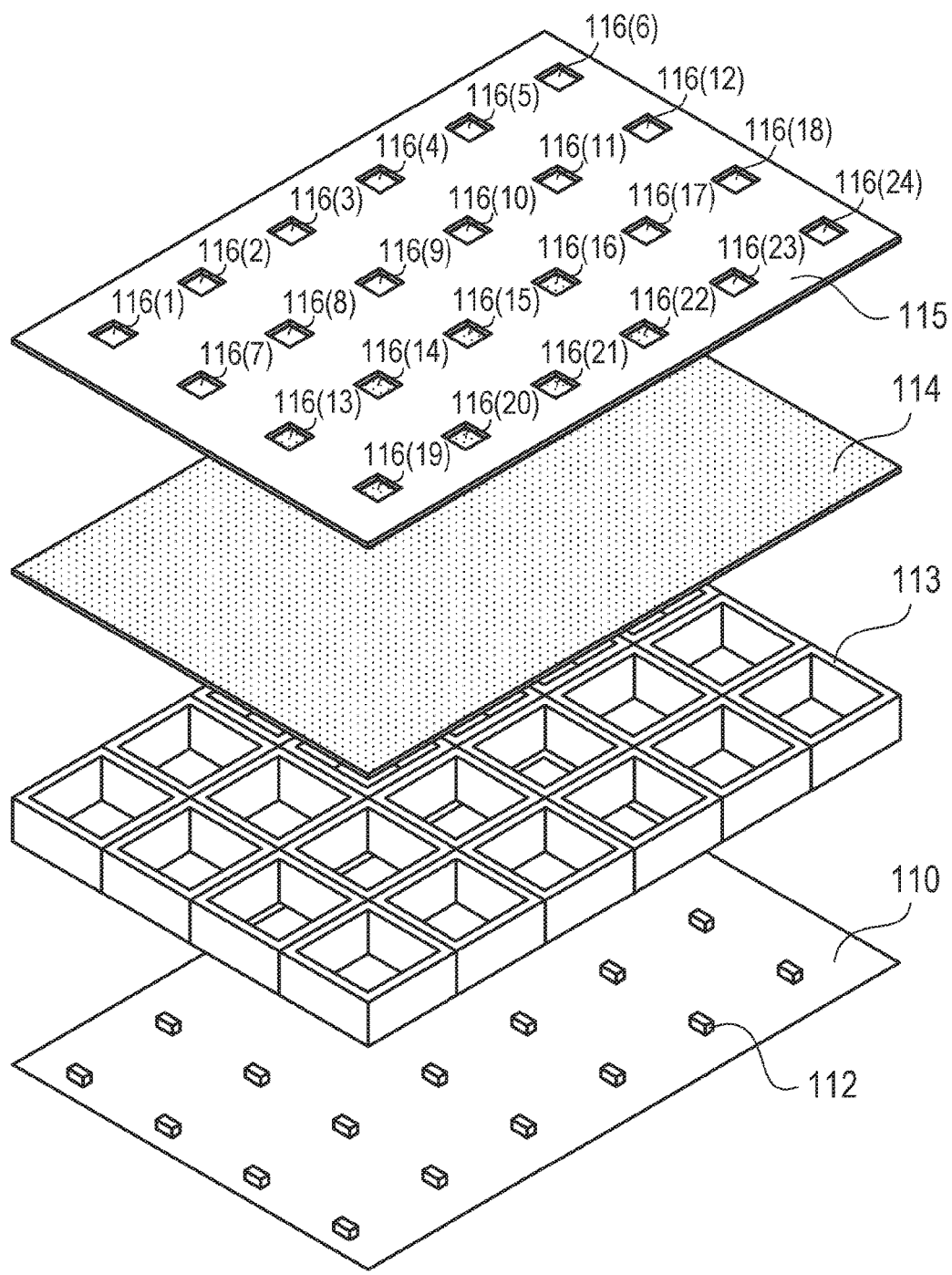
FIG. 3 is an exploded view showing a configuration example of the light-emitting unit according to the first embodiment.

FIG. 3 is an exploded view showing a configuration example of the light-emitting unit 101. The light-emitting unit 101 includes a light-source substrate 110, a plurality of light-source units 112, a lattice-shaped reflection member 113, a quantum dot sheet 114, and a reflection sheet 115.

The light-source substrate 110 is made of, for example, glass epoxy or the like. Various circuits are provided (printed) on the light-source substrate 110. The surface of the light-source substrate 110 is subjected to treatment for improving light reflectivity. For example, the surface of the light-source substrate 110 is coated with white resist ink having high reflectivity of visible light (for example, light having a wavelength of at least 380 nm and not more than 780 nm). Instead of the white resist ink, a sheet member having high reflectivity may be provided.

The plurality of light-source units 112 are provided on the light-source substrate 110 (substrate). Each of the light-source units 112 emits light (excitation light) Le of which the wavelength may be converted by the quantum dot sheet 114 that will be described later. For example, it is assumed that each of the light-source units 112 emits blue light (for example, light having a main wavelength of at least 440 nm and not more than 450 nm). Each of the light-source units 112 includes at least one light-emitting element. As the light-emitting element, a light-emitting diode (LED), an organic electro luminescence (EL) element, a laser light source, a cold cathode fluorescent lamp, or the like may be, for example, used. The number of the light-emitting elements of each of the light-source units 112 is determined according to, for example, required brightness. A signal line is separately wired from a light-emitting driver 120 (not shown) to each of the light-source units 112 so that the light-emitting brightness of each of the light-source units 112 may be separately controlled.

Note that the light emitted from the light-source units 112 is not limited to the blue light. For example, red light, green light, blue light, cyan light, magenta light, yellow light, ultraviolet light (containing near-ultraviolet light), or the like may be emitted from the light-source units 112. The light conversion efficiency of the quantum dot sheet 114 may be increased in such a way that the main wavelength of the light emitted from the light-source units 112 is changed to a short wavelength side. The light conversion efficiency represents efficiency for converting the light (excitation light) of the light-source units 112 into another light (fluorescence). The color gamut of the white light emitted from the backlight unit (light-emitting unit 101), the color gamut of a display image (image displayed on the screen), or the like may be adjusted in such a way that the main wavelength of the light emitted from the light-source units 112 is changed to a long wavelength side.

The lattice-shaped reflection member 113 is provided on the light-source substrate 110. The lattice-shaped reflection member 113 is a lattice-shaped member (frame member) and separates the plurality of light-source units 112 from each other. Specifically, each of the light-source units 112 is surrounded by a part of the lattice-shaped reflection member 113. The lattice-shaped reflection member 113 is, for example, a member manufactured by shaping white resin containing white pigment such as titanium oxide and zinc oxide with a mold. White pigment having high reflectivity of visible light is preferably used.

The quantum dot sheet 114 is provided on the lattice-shaped reflection member 113 (frame member). The quantum dot sheet 114 is, for example, a glass member including quantum dots, a resin member including quantum dots, or the like. The quantum dots are phosphors made of at least one semiconductor particle having a particle diameter of about 1 nm to 30 nm, and emit fluorescence having a shorter wavelength as a semiconductor has a smaller particle diameter. The quantum dot sheet 114 outputs output light Lo obtained by converting at least a part of the wavelength of the excitation light Le when the excitation light Le is incident on the quantum dot sheet 114. The light amount of the output light Lo from the quantum dot sheet 114 becomes larger as a larger number of the quantum dots are present in a path where the excitation light Le passes through the inside of the quantum dot sheet 114. When the density of the quantum dots inside the quantum dot sheet 114 is substantially uniform, the light amount of the output light Lo changes according to the length (conversion-path length) of a path where the excitation light Le passes through the inside of the quantum dot sheet 114. As the conversion-path length is longer, the wavelength of much of the excitation light Le is converted and a larger amount of the output light Lo is output. That is, it may be said that the light conversion efficiency changes according to the conversion-path length.

A manufacturer manufacturing the light-emitting unit 101 may arbitrarily determine the density of the quantum dots inside the quantum dot sheet 114 according to the design of the white balance (color temperature) of the light output from the light-emitting unit 101. However, the manufacturer has a difficulty in finely controlling the distribution of the density of the quantum dots inside the quantum dot sheet 114. Accordingly, the density of the quantum dots inside the quantum dot sheet 114 is substantially uniform inside the quantum dot sheet 114 in many cases.

In the embodiment, the quantum dot sheet 114 is a sheet-shaped conversion member (conversion sheet) containing the quantum dots converting blue light serving as excitation light into red light serving as fluorescence and the quantum dots converting the blue light serving as the excitation light into green light serving as fluorescence. The quantum dot sheet 114 emits the blue light, the red light, and the green light according to the incidence of the blue light emitted from the light-source units 112. Specifically, the quantum dot sheet 114 outputs a part of the blue light emitted from the light-source units 112 after converting the same into the red light, outputs a part of the blue light emitted from the light-source units 112 after converting the same into the green light, and outputs a part of the blue light emitted from the light-source units 112 as it is without converting the same. That is, the quantum dot sheet 114 outputs the output light Lo (red-green light) obtained by converting a part of the excitation light Le and a part of the excitation light Le (blue light) when the excitation light Le (blue light) is incident on the quantum dot sheet 114.

Note that the conversion member is not limited to a sheet-shaped member. The conversion member may include phosphors different from the quantum dots. The conversion member may be paint coated on the surface of a member. The fluorescence is not limited to the red light and the green light. For example, blue light, cyan light, magenta light, yellow light, or the like may be generated as the fluorescence. At least three light beams corresponding to at least three colors, respectively, may be generated as the fluorescence. The light of one color may be generated as the fluorescence. For example, only the yellow light may be generated as the fluorescence.

The reflection sheet 115 is provided on the quantum dot sheet 114 (conversion sheet). The reflection sheet 115 is, for example, a sheet-shaped resin member made of white pigment, fine foaming material, or the like, and is a member having high reflectivity of visible light. A plurality of openings 116 corresponding to the plurality of light-emitting blocks 111, respectively, are provided on the reflection sheet 115. In FIG. 3, an opening 116 corresponding to a light-emitting block 111(x) is described as an "opening 116(x)."

As shown in FIGS. 2 and 3, the light-emitting unit 101 is configured in such a way that the light-source substrate 110 on which the plurality of light-source units 112 are provided, the lattice-shaped reflection member 113, the quantum dot sheet 114, and the reflection sheet 115 are overlapped in order and brought into intimate contact with each other. As a result, a plurality of boxes corresponding to the plurality of light-emitting blocks 111, respectively, are configured. In the embodiment, each of the plurality of boxes will be described as a "quantum dot (QD) box."

Figure 4:
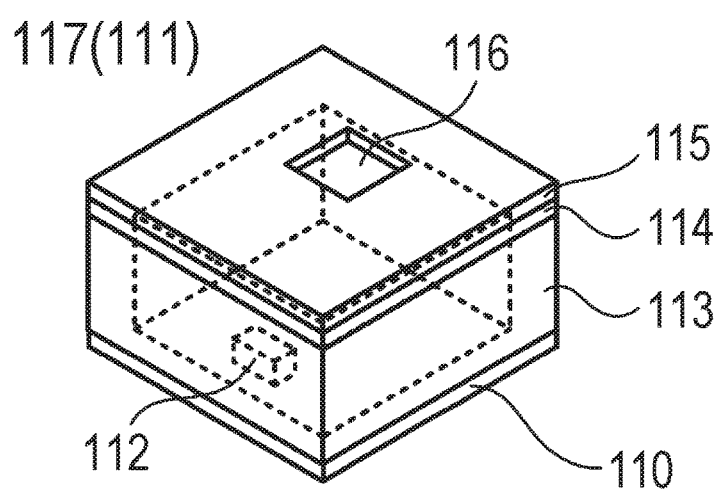
FIG. 4 is a perspective view showing a configuration example of a QD box according to the first embodiment.

FIG. 4 is a perspective view showing a configuration example of a QD box 117. The structure of the QD box is substantially ("substantially" including "completely") the same between a plurality of QD boxes. The QD box 117 has a bottom-surface portion, a frame-shaped side-surface portion, and an upper-surface portion. Specifically, the bottom-surface portion of the QD box 117 is configured by the light-source substrate 110 (bottom-surface member). A part of the side-surface portion of the QD box 117 is configured by the lattice-shaped reflection member 113 (side-surface member), and a part of the side-surface portion of the QD box 117 is configured by a part of the quantum dot sheet 114. Further, the upper-surface portion of the QD box 117 is configured by the reflection sheet 115 (upper-surface member). Inside the QD box, the light-source unit 112 and another part of the quantum dot sheet 114 are provided. That is, the QD box 117 is configured by at least the light-source substrate 110, the lattice-shaped reflection member 113, and the reflection sheet 115, and the light-source unit 112 and the other part of the quantum dot sheet 114 are included in the internal space of the QD box 117.

Further, the opening 116 connecting the inside and the outside of the QD box 117 to each other is provided at a position, on the upper-surface portion (reflection sheet 115) of the QD box 117, which does not face the light-source unit 112. A position facing the light-source unit 112 on the upper-surface portion of the QD box 117 is, for example, a position in a direction (light-axis direction) in which intensity is the highest in the intensity distribution of the light emitted from the light-source unit 112. The intensity distribution is an intensity distribution in the diffusion direction of the light emitted from the light-source unit 112, and is, for example, a Lambert distribution. Here, consideration is given to a case in which the light-source unit 112 is provided to emit the light in its upper direction. In this case, as shown in FIG. 4, the opening 116 is provided at a position not right above the light-source unit 112 on the upper-surface portion (reflection sheet 115) of the QD box 117. It may be said that the opening 116 is an "opening connecting the inside and the outside of the internal space of the QD box 117 to each other."

The QD box 117 reflects the light at its inner surface. Specifically, the blue light emitted from the light-source unit 112 is reflected at the inner surface of the QD box 117 many times and incident on the quantum dot sheet 114 many times. Every time the blue light emitted from the light-source unit 112 is incident on the quantum dot sheet 114, the red light and the green light are generated. The red light and the green light generated by the quantum dot sheet 114 are also reflected at the inner surface of the QD box 117 many times. Then, the white light (light including the red light, the green light, and the blue light) obtained after being subjected to a sufficient number of reflection is output from the inside to the outside of the QD box 117 via the opening 116.

Note that the structure of the QD box 117 is not particularly limited. For example, at least any of the light-source substrate 110, the lattice-shaped reflection member 113, the quantum dot sheet 114, and the reflection sheet 115 may not be shared by the plurality of QD boxes 117, but a plurality of members corresponding to the plurality of QD boxes 117, respectively, may be provided. The QD box 117 may be configured by only the light-source substrate 110, the lattice-shaped reflection member 113, and the reflection sheet 115. The QD box 117 may be further configured by a member other than the light-source substrate 110, the lattice-shaped reflection member 113, the quantum dot sheet 114, and the reflection sheet 115. The light emitted from the QD box 117 is not limited to the white light. For example, red light, green light, blue light, cyan light, magenta light, yellow light, or the like may be emitted from the QD box 117.

Figure 5:
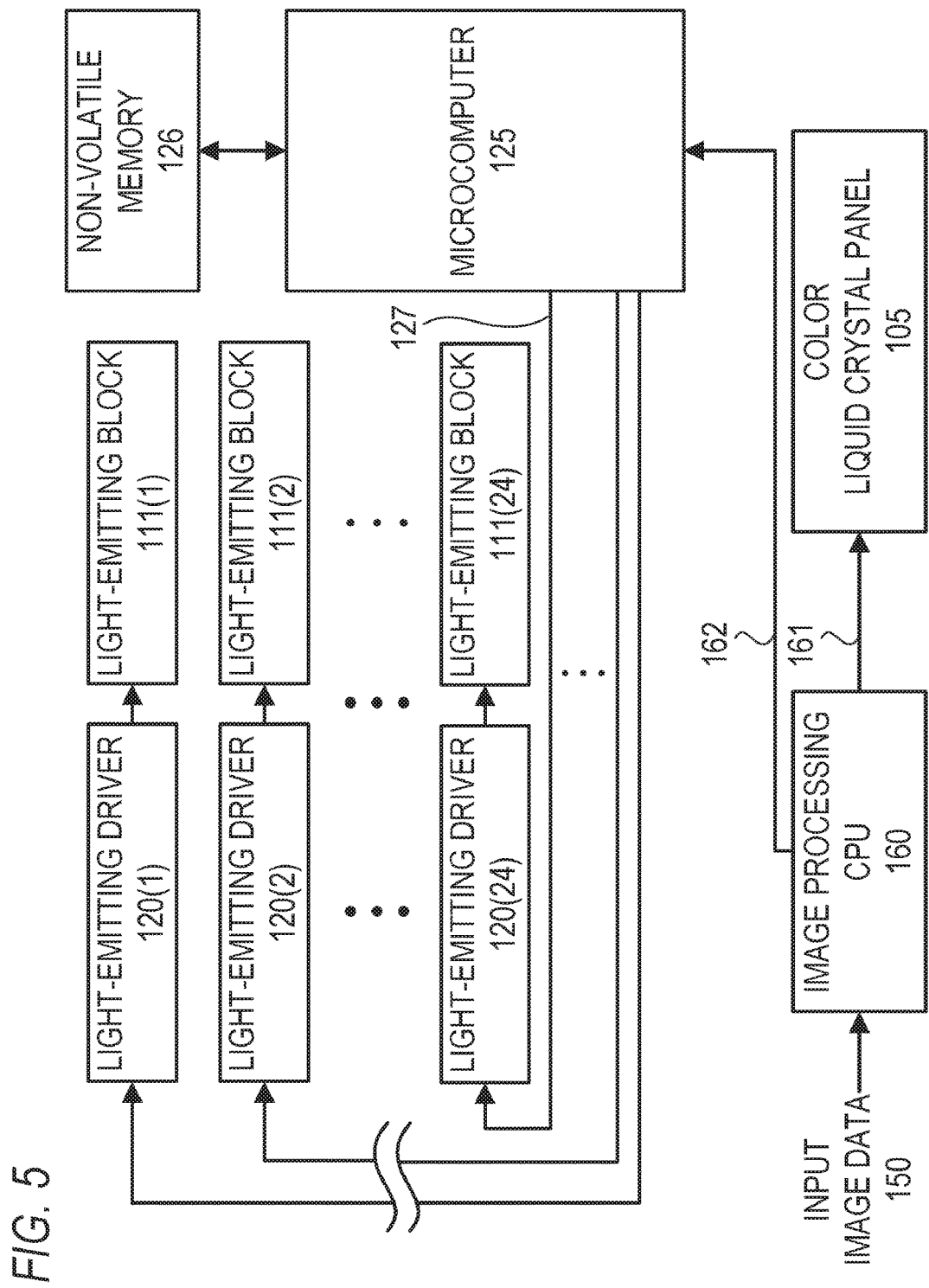
FIG. 5 is a block diagram showing a configuration example of the color display apparatus according to the first embodiment.

FIG. 5 is a block diagram showing a configuration example of the color display apparatus according to the embodiment. In the embodiment, the transmittance of the color liquid-crystal panel 105 is controlled on the basis of input image data 150 as described above. In addition, the light-emitting brightness of each of the plurality of light-source units 112 provided in the plurality of QD boxes 117, respectively, is controlled on the basis of the input image data 150.

An image processing central processing unit (CPU) 160 analyzes the input image data 150. In the embodiment, a plurality of regions of the screen are set in advance as a plurality of corresponding regions corresponding to the plurality of light-emitting blocks 111, respectively. For each of the light-emitting blocks 111, the image processing CPU 160 acquires a characteristic value of a part to be displayed in a corresponding region of the input image data 150 from the input image data 150. The characteristic value represents the histogram of the brightness of the image data, the central value (such as the maximum value, the minimum value, the average value, the mode, and the intermediate value) of the brightness of the image data, the histogram of the gradation value of the image data, the mode of the gradation value of the image data, or the like.

Note that the plurality of corresponding regions may or may not be a plurality of divided regions constituting the screen. For example, the corresponding regions may be regions separated from other corresponding regions, or at least a part of the corresponding regions may be regions overlapped with at least a part of other corresponding regions.

Then, the image processing CPU 160 determines a plurality of LD correction coefficients 162 corresponding to the plurality of light-emitting blocks 111, respectively, according to the plurality of characteristic values, and transmits the plurality of LD correction coefficients 162 to a microcomputer 125. The LD correction coefficients 162 are correction parameters for correcting the light-emitting brightness of the light-emitting blocks 111 (the light-source units 112 of the light-emitting blocks 111). For example, the LD correction coefficients 162 are so determined that the light-emitting brightness of the light-emitting blocks 111 irradiating light onto regions in which a dark image is to be displayed is decreased, and that the light-emitting brightness of the light-emitting blocks 111 irradiating the light onto regions in which a bright image is to be displayed is increased. Specifically, the LD correction coefficients 162 are so determined that the light-emitting brightness of the light-emitting blocks 111 corresponding to corresponding regions in which a dark image is to be displayed is decreased, and that the light-emitting brightness of the light-emitting blocks 111 corresponding to corresponding regions in which a bright image is to be displayed is increased. By such control of the light-emitting brightness, the contrast ratio of a display image may be improved.

In addition, the image processing CPU 160 corrects the input image data 150 according to the plurality of characteristic values or the plurality of LD correction coefficients 162 to generate display image data 161. Then, the image processing CPU 160 outputs the display image data 161 to the color liquid-crystal panel 105. Thus, the transmittance of the color liquid-crystal panel 105 is controlled according to the display image data 161. When the light-emitting brightness of the light-emitting blocks 111 is corrected by the LD correction coefficients 162, a black floating phenomenon called "halo" sometimes occurs in a display image. For example, when the light-emitting brightness of the light-emitting blocks 111 corresponding to corresponding regions in which a bright image is to be displayed is increased, light leaks to peripheral regions in which a dark image is to be displayed. As a result, the black floating phenomenon due to the leakage of the light sometimes occurs in the peripheral regions. The image processing CPU 160 applies, for example, image processing for reducing the above halo to the input image data 150 to generate the display image data 161. Specifically, the image processing CPU 160 applies image processing for reducing the brightness of parts in which the black floating phenomenon occurs to the input image data 150 to generate the display image data 161.

A non-volatile memory 126 stores a reference driver control signal in advance. The reference driver control signal corresponds to the reference light-emitting brightness of the light-emitting blocks 111. A plurality of light-emitting drivers 120 correspond to the plurality of light-emitting blocks 111, respectively. Therefore, the plurality of LD correction coefficients 162 corresponding to the plurality of light-emitting blocks 111, respectively, correspond to the plurality of light-emitting drivers 120, respectively. In FIG. 5, a light-emitting driver 120 corresponding to the light-emitting block 111($x$) is described as a "light-emitting driver 120($x$)."

The microcomputer 125 reads the reference driver control signal from the non-volatile memory 126. Then, for each of the light-emitting drivers 120, the microcomputer 125 performs processing for correcting the reference driver control signal using the LD correction coefficients 162 corresponding to the light-emitting drivers 120 and outputting a corrected driver control signal 127 to the light-emitting drivers 120. Each of the light-emitting drivers 120 supplies a driving signal according to the driver control signal 127 output from the microcomputer 125 to the light-emitting block 111 corresponding to the light-emitting driver 120. Thus, the light-emitting brightness of each of the light-emitting blocks 111 (each of the light-source units 112) is controlled at light-emitting brightness according to the driving signal supplied to the corresponding light-emitting block 111.

As control for the light-emitting brightness of the light-emitting blocks 111, pulse width modulation (PWM) control for controlling the pulse widths of the driving signals (pulse signals) supplied to the light-emitting blocks 111, pulse amplitude modulation (PAM) control for controlling the peak values of the driving signals, the combination of the PWM control and the PAM control, or the like is performed. The driver control signals 127 are, for example, signals representing the pulse widths of the driving signals, the peak values of the driving signals, or the like.

Such light-emitting brightness control for each of the light-emitting blocks 111 according to the features of an image is called "local dimming control." In addition, local dimming control for increasing the display brightness (brightness on the screen) of a small region in which a bright image is to be displayed is called "high dynamic range (HDR) control."

A description will be given, with reference to FIGS. 6A, 6B, 7A, 7B, and 8, of an example of a problem to be solved by the embodiment. FIGS. 6A, 6B, 7A, 7B, and 8 show the cross section of a light-emitting unit not including the QD boxes 117. FIGS. 6A, 6B, 7A, 7B, and 8 show the cross section obtained from a surface perpendicular to the light-emitting surface of the light-emitting unit. In FIGS. 6A, 6B, 7A, 7B, and 8, the light-emitting surface corresponds to the sheet surface of the quantum dot sheet 114. When the light-emitting unit does not include the QD boxes 117, unintended color irregularities sometimes occur in light emitted from the light-emitting unit, light emitted from the backlight unit, a display image, or the like.

Figure 6A:
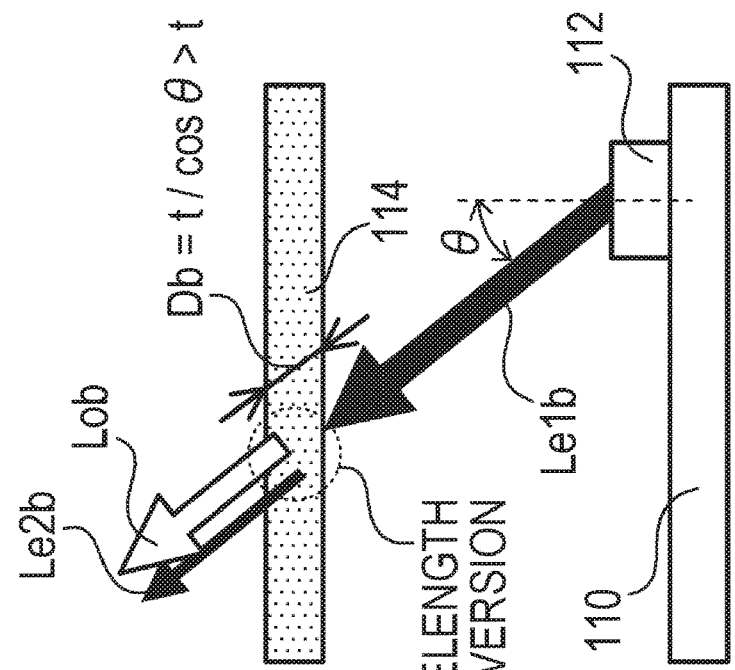
FIGS. 6A and 6B are schematic views each showing an example of the cross section of a light-emitting unit.

Blue light emitted from each of the light-source units 112 is diffused in a wide range. FIG. 6A is a schematic view showing a state in which the wavelength of blue light Le1$a$ emitted in a perpendicular direction from the light-source unit 112 is converted by the quantum dot sheet 114. When the blue light Le1a is incident on the quantum dot sheet 114, the wavelength of a part of the blue light Le1a is convened by the quantum dot sheet 114. A part of the blue light Le1a is converted into red-green light Loa by the wavelength conversion, and the red-green light Loa is emitted from the quantum dot sheet 114. In addition, blue light Le2a representing a part of the blue light Le1a is emitted from (passes through) the quantum dot sheet 114 without being converted by the quantum dot sheet 114. Here, a conversion-path length Da for the blue light Le1a corresponds to thickness t in the perpendicular direction of the quantum dot sheet 114.

Figure 6B:
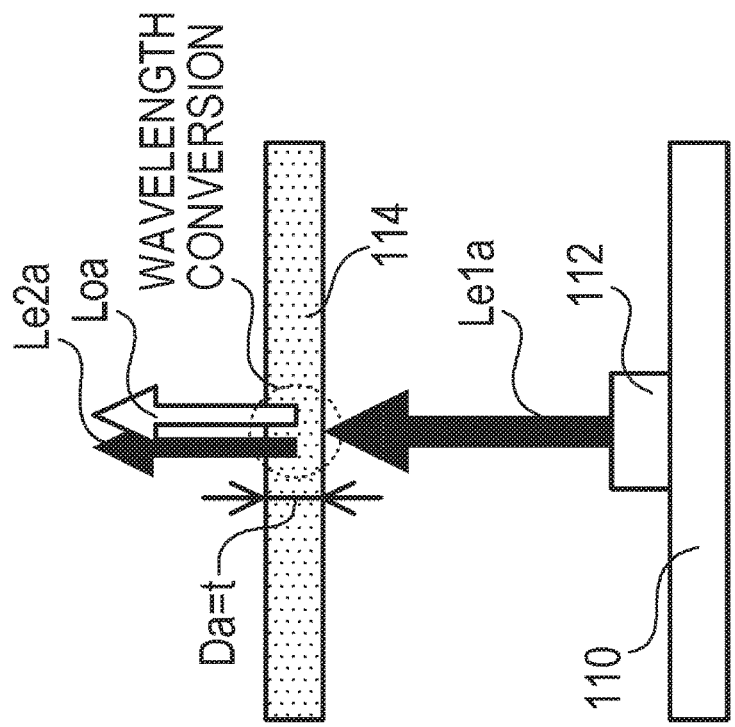

FIG. 6B is a schematic view showing a state in which the wavelength of blue light Le1b emitted in an oblique direction from the light-source unit 112 is converted by the quantum dot sheet 114. It is assumed that the blue light Le1b is emitted to be inclined by an angle θ with respect to a top-bottom direction. In addition, it is assumed that the angle θ is larger than zero and smaller than π/2. Moreover, it is assumed that the light amount of the blue light Le1b is substantially the same as that of the blue light Le1a. When the blue light Le1b is incident on the quantum dot sheet 114, the wavelength of a part of the blue light Le1b is converted by the quantum dot sheet 114. A part of the blue light Le1b is converted into red-green light Lob by the wavelength conversion, and the red-green light Lob is emitted from the quantum dot sheet 114. In addition, blue light Le2b representing a part of the blue light Le1b passes through the quantum dot sheet 114.

Here, a conversion-path length Db for the blue light Le1b is represented as a length t/cos(θ) and longer than the conversion-path length Da=t shown in FIG. 6A. That is, the number of quantum dots present in a path where the blue light Le1b passes through the inside of the quantum dot sheet 114 is larger than that of quantum dots present in a path where the blue light Le1a passes through the inside of the quantum dot sheet 114. Accordingly, the light amount of the blue light Le2b is smaller than that of the blue light Le2a. In addition, the light amount of the red-green light Lob is larger than that of the red-green light Loa. As a result, the color of light composed of the blue light Le2b and the red-green light Lob is different from that of light composed of the blue light Le2a and the red-green light Loa. Specifically, the color of the light output from the quantum dot sheet 114 shown in FIG. 6B is stronger in a red-green tinge than that of the light output from the quantum dot sheet 114 shown in FIG. 6A.

As described above, the color of the light emitted from the light-source unit 112 and then emitted from the quantum dot sheet 114 depends on a conversion-path length (distance at which the light emitted from the light-source unit 112 passes through the quantum dot sheet 114). Therefore, when only a specific part of the light-emitting blocks 111 (a specific part of the light-source units 112) is lighted up by the local dimming control or the HDR control, unintended color irregularities due to a difference in the conversion-path length occur. Specifically, color irregularities close to a red-green color occur in the color of the light in an oblique direction in which the conversion-path length is long, compared with the color of the light in a perpendicular direction in which the conversion length is short. In other words, color irregularities closer to the red-green color occur in a surface parallel to the light-emitting surface as the distance of the light from a specific part of the light-emitting blocks 111 increases.

The light emitted from the quantum dot sheet 114 is reflected by the optical sheet 106, the light-source substrate 110, or the like. Therefore, the light emitted from the quantum dot sheet 114 is sometimes incident on the quantum dot sheet 114, and the blue light emitted from the light-source units 112 sometimes passes through the quantum dot sheet 114 a plurality of times.

FIG. 7A is a schematic view showing a state in which blue light Le1c emitted from the light-source unit 112 passes through the quantum dot sheet 114 only once. When the blue light Le1c is incident on the quantum dot sheet 114, the wavelength of a part of the blue light Le1c is converted by the quantum dot sheet 114. A part of the blue light Le1c is converted into red-green light Loc by the wavelength conversion, and the red-green light Loc is emitted from the quantum dot sheet 114. In addition, blue light Le2c representing a part of the blue light Le1c passes through the quantum dot sheet 114.

FIG. 7B is a schematic view showing a state in which blue light Le1d emitted from the light-source unit 112 passes through the quantum dot sheet 114 twice. When the blue light Le1d is incident on the quantum dot sheet 114, the wavelength of a part of the blue light Le1d is converted by the quantum dot sheet 114 (first wavelength conversion). A part of the blue light Le1d is converted into red-green light Lo1d by the first wavelength conversion, and the red-green light Lo1d is emitted from the quantum dot sheet 114. In addition, blue light Le2d representing a part of the blue light Le1d passes through the quantum dot sheet 114.

The light (the blue light Le2d and the red-green light Le1d) emitted from the quantum dot sheet 114 is reflected by the optical sheet 106, reflected by the light-source substrate 110, and incident on the quantum dot sheet 114. When the blue light Le2d is incident on the quantum dot sheet 114, the wavelength of a part of the blue light Le2d is converted by the quantum dot sheet 114 (second wavelength conversion). A part of the blue light Le2d is converted into red-green light by the second wavelength conversion. Then, red-green light Lo2d containing red-green light generated by the second wavelength conversion and the red-green light Lo1d generated by the first wavelength conversion is emitted from the quantum dot sheet 114. In addition, blue light Le3d representing a part of the blue light Le2d passes through the quantum dot sheet 114.

Here, the light amount of the blue light Le decreases and the light amount of the red-green light Lo increases with an increase in the number of the wavelength conversion. Accordingly, the light amount of the blue light Le3d is smaller than that of the blue light Le2c. In addition, the light amount of the red-green light Lo2d is larger than that of the red-green light Loc. As a result, the color of the light composed of the blue light Le3d and the red-green light Lo2d is different from that of the light composed of the blue light Le2c and the red-green light Loc. Specifically, the color of the light output from the quantum dot sheet 114 shown in FIG. 7B is stronger in a red-green tinge than that of the light output from the quantum dot sheet 114 shown in FIG. 7A.

As described above, the color of the light emitted from the light-source unit 112 and then emitted from the quantum dot sheet 114 depends on the number of conversion (the number of wavelength conversion). Therefore, when only a specific part of the light-emitting blocks 111 (a specific part of the light-source units 112) is lighted up by the local dimming control or the HDR control, unintended color irregularities due to a difference in the number of conversion occur. Specifically, color irregularities close to a red-green color occur in the color of the light in a region in which the wavelength of the light is converted many times, compared with the color of the light in a region in which the wavelength of the light is less converted. In other words, color irregularities closer to the red-green color occur in the surface parallel to the light-emitting surface as the distance of the light from a specific part of the light-emitting blocks 111 increases.

The red-green light generated by the quantum dot sheet 114 is emitted in various directions (directions in 360 degrees) from the quantum dot sheet 114. Therefore, the red-green light emitted from the quantum dot sheet 114 is diffused in a wider range than the blue light emitted from the quantum dot sheet 114. FIG. 8 is a schematic view showing the state of diffused light. When blue light Le1e emitted from the light-source unit 112 is incident on the quantum dot sheet 114, the wavelength of a part of the blue light Le1e is converted by the quantum dot sheet 114. A part of the blue light Le1e is converted into red-green light Loe by the wavelength conversion, and the red-green light Loe is emitted from the quantum dot sheet 114. In addition, blue light Le2e representing a part of the blue light Le1e passes through the quantum dot sheet 114. At this time, the red-green light Loe is diffused in a wider range than the blue light Le2e.

Then, when only a specific part of the light-emitting blocks 111 (a specific part of the light-source units 112) is lighted up by the local dimming control or the HDR control, unintended color irregularities due to the above difference in the diffusion of the light occur. Specifically, the light amount of the blue light Le2e is smaller in a region closer to the light-source unit 112 than a region separated from the light-source unit 112. Therefore, color irregularities closer to the red-green color occur in the surface parallel to the light-emitting surface as the distance of the light from a specific part of the light-emitting blocks 111 increases.

Figure 9:
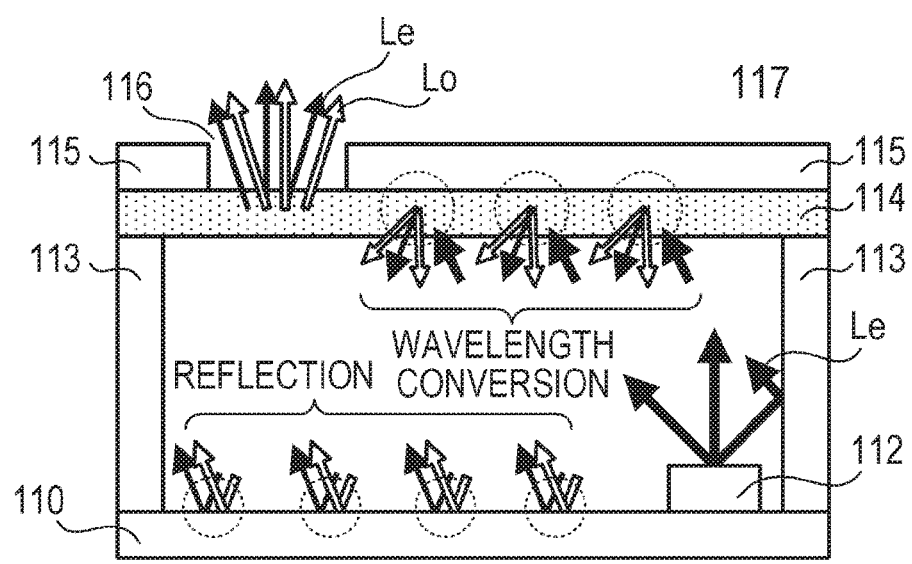
FIG. 9 is a schematic view showing an example of the cross section of the light-emitting unit according to the first embodiment.
Figure 10:
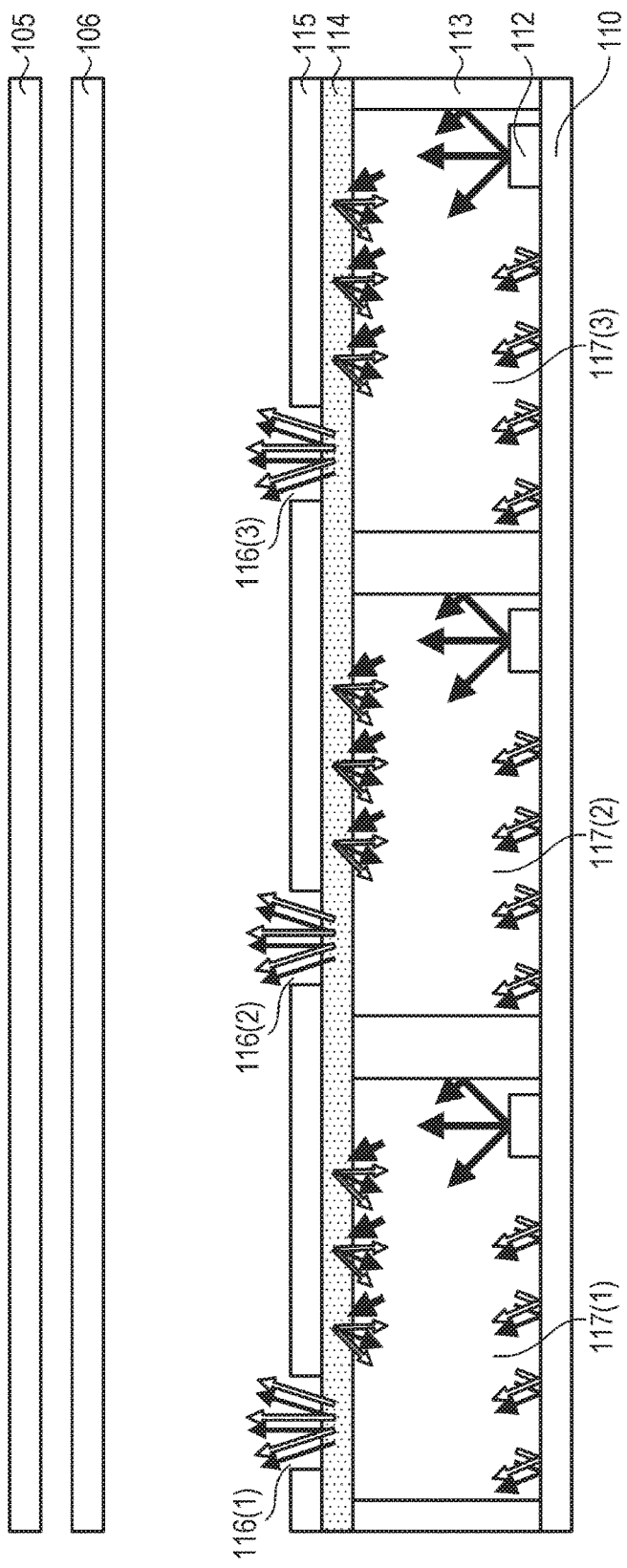
FIG. 10 is a schematic view showing an example of the cross section of the light-emitting unit according to the first embodiment.
Figure 11:
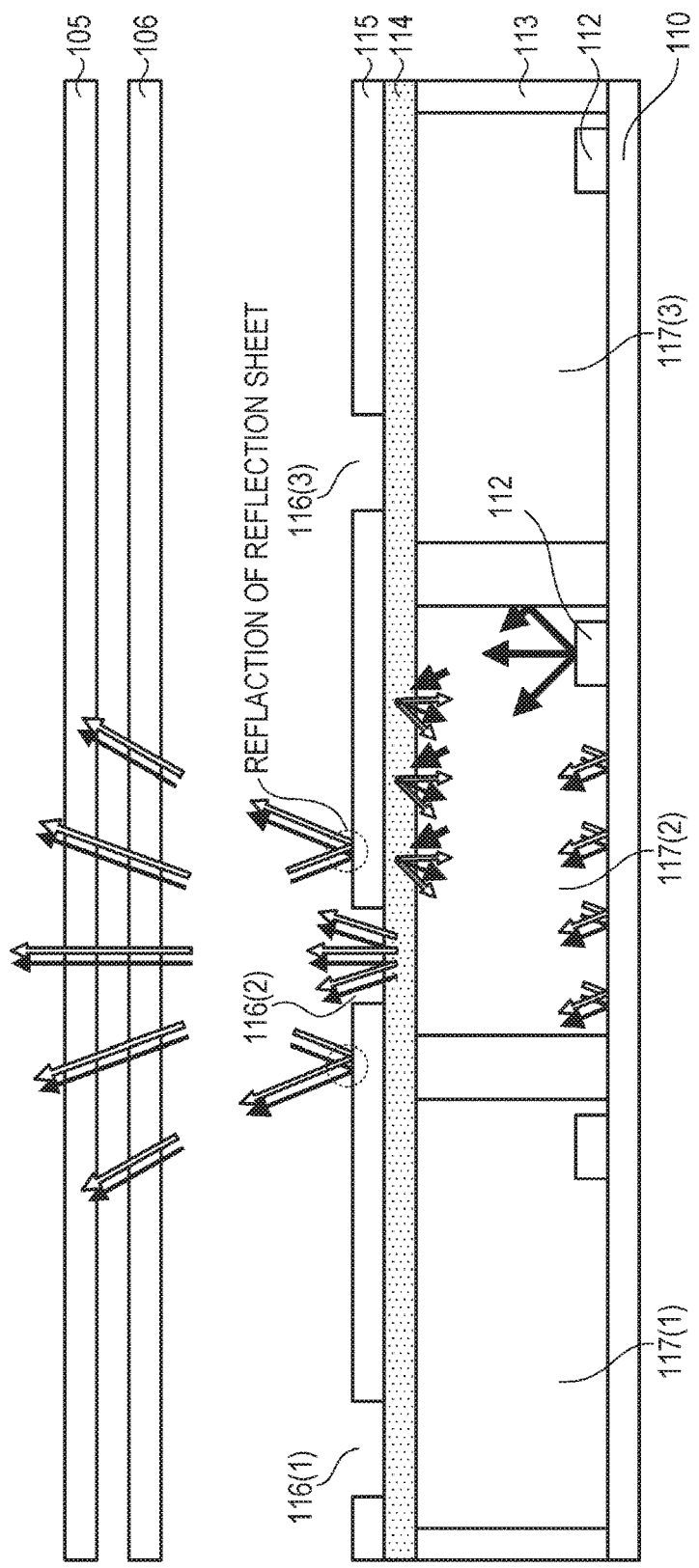
FIG. 11 is a schematic view showing an example of the cross section of the light-emitting unit according to the first embodiment.

A description will be given, with reference to FIGS. 9 to 11, of an example of an effect obtained by the embodiment. FIGS. 9 to 11 show the cross section of the light-emitting unit 101 obtained from a surface perpendicular to the light-emitting surface of the light-emitting unit 101. The light-emitting surface of the light-emitting unit 101 corresponds to the outside upper surfaces of the QD boxes 117 and corresponds to the sheet surface of the reflection sheet 115.

FIG. 9 shows one QD box 117. When the blue light Le emitted from the light-source unit 112 is incident on the quantum dot sheet 114, the wavelength of a part of the blue light Le is converted by the quantum dot sheet 114. A part of the blue light Le is converted into the red-green light Lo by the wavelength conversion, and the red-green light Lo is emitted from the quantum dot sheet 114. In addition, a part of the blue light Le passes through the quantum dot sheet 114. Inside the QD box 117, the blue light Le and the red-green light Lo are repeatedly reflected by the reflection sheet 115, the light-source substrate 110, the lattice-shaped reflection member 113, or the like and repeatedly incident on the quantum dot sheet 114. Then, the blue light Le is output to the outside of the QD box 117 via the opening 116 after being subjected to a sufficient number of reflection and a sufficient number of wavelength conversion. Similarly, the red-green light Lo is output to the outside of the QD box 117 via the opening 116 after being subjected to a sufficient number of reflection. Since the wavelength conversion is repeatedly performed, well-balanced white light may be obtained as light emitted from the QD box 117 in such a way that a relatively small number of the quantum dots are contained in the quantum dot sheet 114.

As described above, unintended color irregularities occur due to a difference in a conversion-path length, a difference in the number of conversion, or the like. In the embodiment, since the light after passing through a sufficiently long conversion path and being subjected to a sufficient number of conversion is emitted from the QD box 117, unintended color irregularities due to a difference in a conversion-path length and unintended color irregularities due to a difference in the number of conversion hardly occur. In addition, as described above, unintended color irregularities occur due to a difference in the diffusion between the blue light Le and the red-green light Lo. In the embodiment, since the light is emitted from the QD box 117 after being subjected to a sufficient number of reflection, the red-green light Lo and the blue light Le may be sufficiently diffused inside the QD box 117 and the occurrence of color irregularities due to a difference in the diffusion may be reduced.

In the QD box 117, the opening 116 is preferably small to a certain extent. In addition, the opening 116 is not preferably provided at a position facing the light-source unit 112. For example, as shown in FIG. 9, the size of the opening 116 is preferably about a fraction of the size of the internal space of the QD box 117 in a direction parallel to the light-emitting surface. Further, in the QD box 117, the opening 116 and the light-source unit 112 are preferably provided at diagonal positions. If the size of the opening 116 is too large or the opening 116 is provided at a position facing the light-source unit 112, light not subjected to at least one of a sufficient number of reflection and a sufficient number of wavelength conversion is emitted from the QD box 117. Therefore, unintended color irregularities are likely to occur. In addition, if the opening 116 is too small, extraction efficiency for extracting light from the QD box 117 is degraded. Therefore, the size of the opening 116 is preferably determined in consideration of the unintended color irregularities and the extraction efficiency.

FIG. 10 shows an example of a case in which all the QD boxes 117 are lighted up. FIG. 10 shows three QD boxes 117. In FIG. 10, the x-th QD box 117 is described as a "QD box 117(x)," and the opening 116 of the QD box 117(x) is described as an "opening 116(x)." Inside each of the QD boxes 117, a sufficient number of reflection and a sufficient number of wavelength conversion are performed. Then, light after being subjected to the sufficient number of reflection and the sufficient number of wavelength conversion is emitted from each of the QD boxes 117. Therefore, well-balanced white light is emitted from each of the QD boxes 117. As a result, light having substantially no color irregularities may be obtained as light emitted from the light-emitting unit 101, light emitted from the backlight unit, or the like, and a display image having substantially no color irregularities may be obtained.

FIG. 11 shows an example of a case in which only one QD box 117 is lighted up by the local dimming control or the HDR control. FIG. 11 shows three QD boxes 117. In FIG. 11, only a QD box 117(2) is lighted up. In the QD box 117(2), a sufficient number of reflection and a sufficient number of wavelength conversion are performed. Then, light after being subjected to the sufficient number of reflection and the sufficient number of wavelength conversion is emitted from the QD box 117(2). Therefore, well-balanced white light is emitted from the QD box 117(2). The white light emitted from the QD box 117(2) passes through the optical sheet 106 and the color liquid-crystal panel 105, while being diffused by the reflection of the optical sheet 106, the reflection of the reflection sheet 115, or the like. Here, the white light emitted from the QD box 117(2) is less likely to be returned to the quantum dot sheet 114. Therefore, the white light emitted from the QD box 117(2) passes through the optical sheet 106 and the color liquid-crystal panel 105, while being diffused in a well-balanced state. As a result, light having less color irregularities may be obtained as light emitted from the backlight unit, and a display image having less color irregularities may be obtained.

As described above, according to the embodiment, the occurrence of unintended color irregularities in light emitted from a light-emitting apparatus including a conversion member may be reduced, and thus the occurrence of unintended color irregularities in a display image may be reduced. Note that the embodiment describes an example in which a light-emitting apparatus includes a plurality of QD boxes, but one QD box may be provided.

Figure 12:
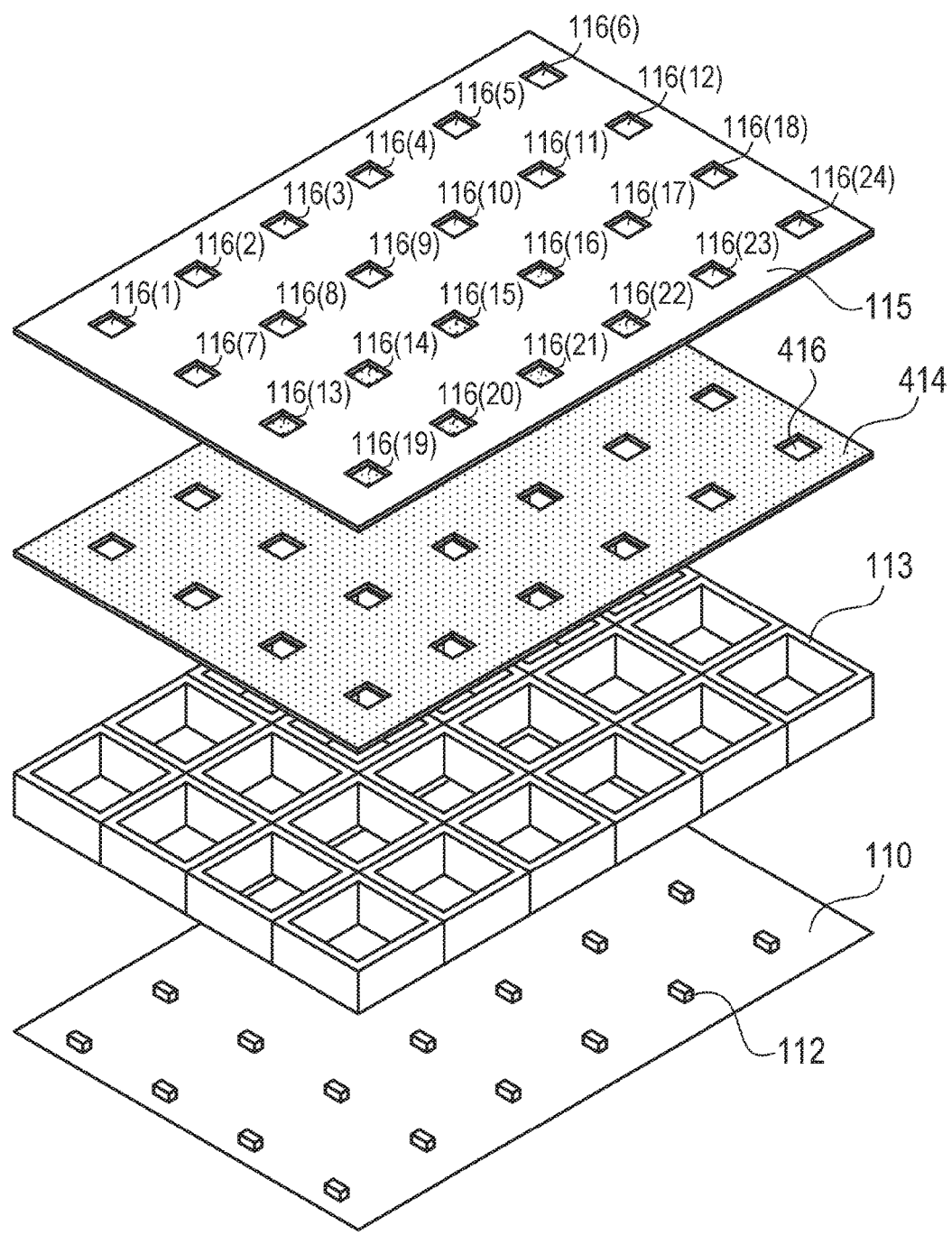
FIG. 12 is an exploded view showing a configuration example of another light-emitting unit according to the first embodiment.

Note that as shown in FIG. 12, a quantum dot sheet 414 on which a plurality of openings 416 corresponding to a plurality of QD boxes 117, respectively, are provided is preferably used instead of the quantum dot sheet 114. On a surface parallel to the light-emitting surface, the openings 416 are provided at positions substantially the same as those of the openings 116. Therefore, the inside and the outside of the QD boxes 117 are connected to each other by the openings 416 and 116 without passing through the quantum dot sheet 414. The openings 416 are preferably formed by laser cutting or the like so that the sealed state of the quantum dots is maintained.

Figure 13:
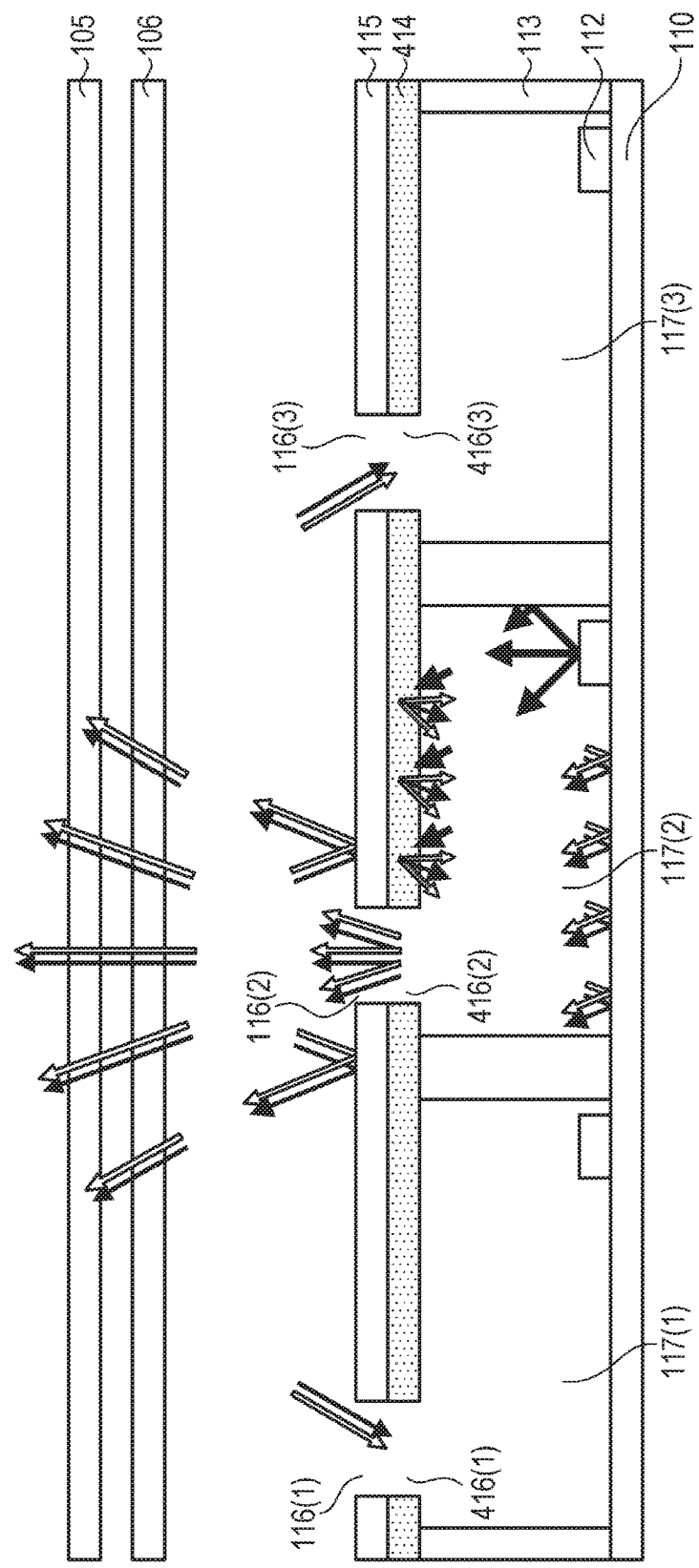
FIG. 13 is a schematic view showing an example of the cross section of another light-emitting unit according to the first embodiment.

FIG. 13 shows the cross section of the light-emitting unit 101 including the quantum dot sheet 414. FIG. 13 shows an example of a case in which only one QD box 117 is lighted up by the local dimming control or the HDR control. FIG. 13 shows three QD boxes 117. In FIG. 13, only the QD box 117(2) is lighted up. Like FIG. 11, well-balanced white light is emitted from the QD box 117(2). Then, like FIG. 11, the white light emitted from the QD box 117(2) passes through the optical sheet 106 and the color liquid-crystal panel 105, while being diffused by the reflection of the optical sheet 106, the reflection of the reflection sheet 115, or the like. Here, since the openings 416 are provided on the quantum dot sheet 414, the white light emitted from the QD box 117(2) and returned to the quantum dot sheet 414 may be reduced. As a result, light having less color irregularities may be obtained as light emitted from the backlight unit, and a display image having less color irregularities may be obtained. In FIG. 13, the opening 416 of the QD box 117(x) is described as an "opening 416(x)."

Figure 14:
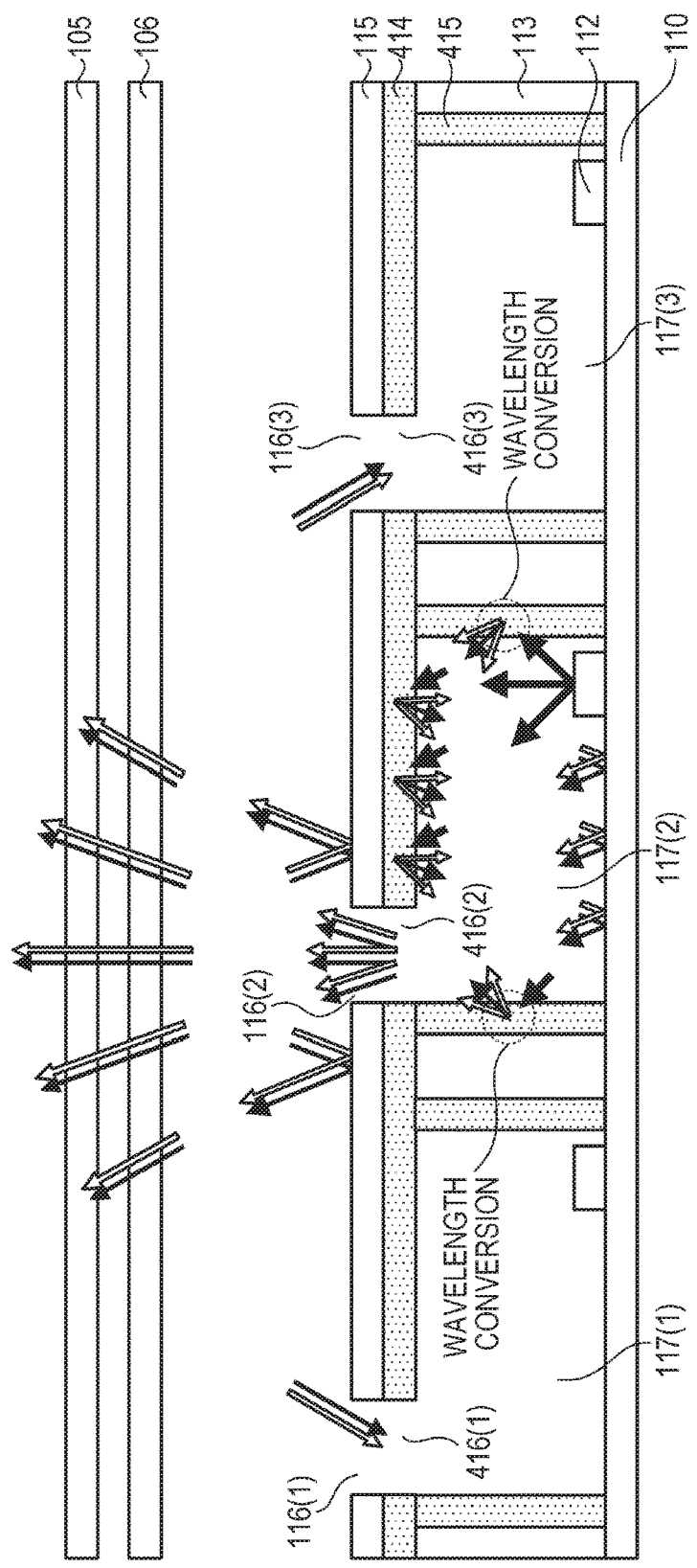
FIG. 14 is a schematic view showing an example of the cross section of another light-emitting unit according to the first embodiment.

The embodiment describes an example in which the quantum dot sheets 114 and 414 are used as the conversion members. The quantum dot sheets 114 and 414 are members provided along the internal upper surfaces of the QD boxes 117 (the sheet surface of the reflection sheet 115). However, the conversion members are not limited to the members provided along the internal upper surfaces of the QD boxes 117. For example, as shown in FIG. 14, the conversion members may include a member 415 provided along the internal side surfaces of the QD boxes 117 (the surfaces of the lattice-shaped reflection members 113). In the example of FIG. 14, the member 415 is paint (quantum dot paint) containing the quantum dots. In the example of FIG. 14, the quantum dot sheet 414 and the quantum dot paint 415 are provided on the QD boxes 117. Therefore, wavelength conversion is performed not only by the quantum dot sheet 414 but also by the quantum dot paint 415, and well-balanced white light may be obtained as light emitted from the QD boxes 117. Note that only the member provided along the internal side surfaces of the QD boxes 117 may be used as the conversion member.

In addition, the arrangement of the light-source units 112 is not limited to the arrangement shown in FIG. 9 or the like. For example, the light-source units 112 may be provided on the lattice-shaped reflection member 113. Alternatively, the light-source units 112 may be provided in concave parts provided on the light-source substrate 110.

Second Embodiment

Hereinafter, a description will be given of a second embodiment of the present invention. Note that in the second embodiment, points (configurations, processing, or the like) different from those of the first embodiment will be described in detail and the same points as those of the first embodiment will be omitted. The first embodiment describes an example in which the occurrence of unintended color irregularities may be reduced. The second embodiment will describe an example in which the brightness distribution of light emitted from a light-emitting apparatus may be improved, while the occurrence of unintended color irregularities may be reduced.

Figure 15:
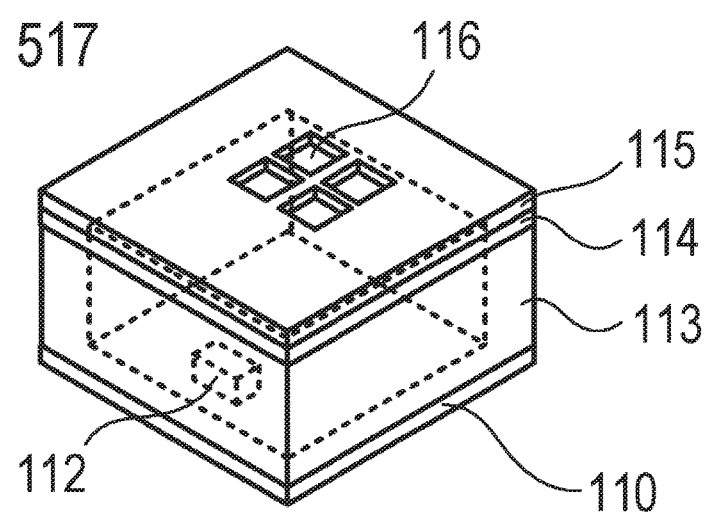
FIG. 15 is a perspective view showing a configuration example of a QD box according to a second embodiment.

FIG. 15 is a perspective view showing a configuration example of a QD box 517 according to the second embodiment. A plurality of openings 116 are provided on the QD box 517. The number of the openings 116 provided on one QD box 517 is not particularly limited, but four openings 116 are provided on the one QD box 517 in the example of FIG. 15. The four openings 116 are provided close to each other.

Figure 16:
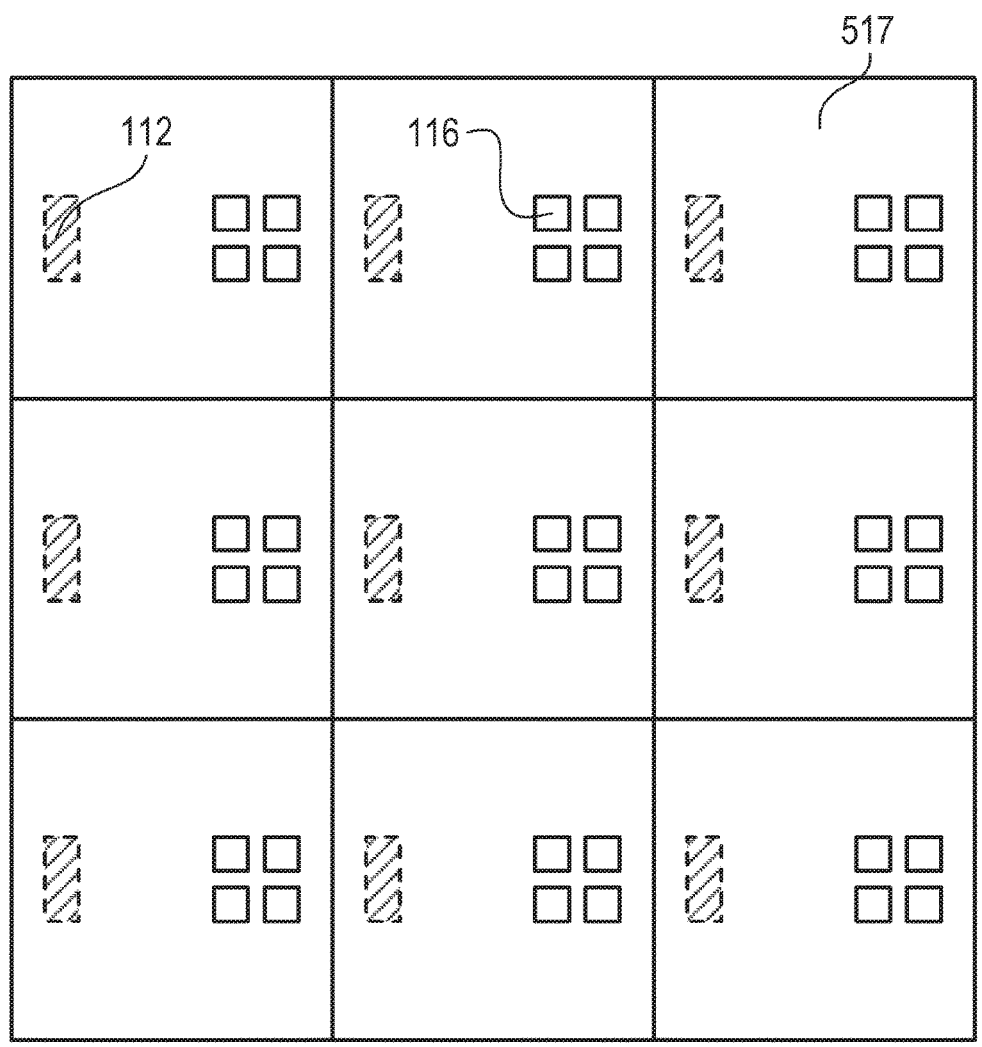
FIG. 16 is a schematic view showing an example of the positional relationship between a light-source unit and openings according to the second embodiment.

FIG. 16 is a schematic view showing an example of the positional relationship between a light-source unit 112 and the openings 116. FIG. 16 shows the positional relationship in a surface parallel to a light-emitting surface. Like the first embodiment, the four openings 116 are provided at a position, on the upper-surface portion (reflection sheet 115) of the QD box 517, which does not face the light-source unit 112. In the example of FIG. 16, the light-source unit 112 and the four openings 116 are provided are provided at one and the other ends in a horizontal direction, respectively, inside the QD box 517. Here, the aggregate of the four openings 116 provided on the QD box 517 is described as an "opening group." In the example of FIG. 16, a plurality of opening groups provided on a plurality of the QD boxes 517, respectively, are arranged at even intervals. Therefore, when all the QD boxes 517 are lighted up, light having substantially no irregularities (brightness irregularities, color irregularities, or the like) may be obtained as light emitted from a light-emitting unit 101, light emitted from a backlight unit, or the like. In addition, a display image having substantially no irregularities may be obtained.

Figure 17:
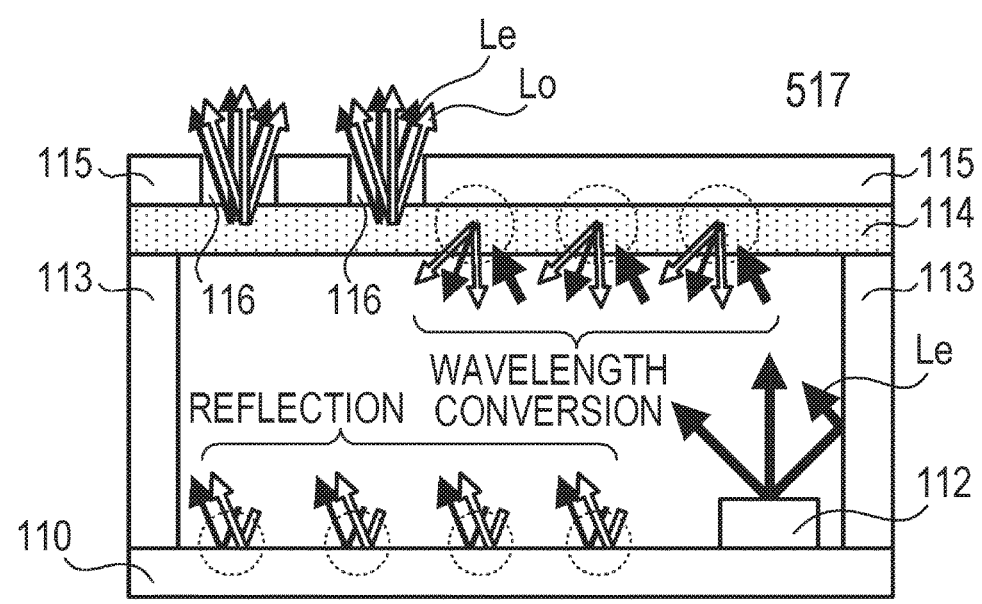
FIG. 17 is a schematic view showing an example of the cross section of the QD box according to the second embodiment.

FIG. 17 shows the cross section of the QD box 517 obtained from a surface perpendicular to the light-emitting surface. Like the first embodiment, blue light Le is output to the outside of the QD box 517 via the four openings 116 after being subjected to a sufficient number of reflection and a sufficient number of wavelength conversion. Similarly, red-green light Lo is output to the outside of the QD box 517 via the four openings 116 after being subjected to a sufficient number of reflection. Therefore, unintended color irregularities may be reduced like the first embodiment. In addition, since the plurality of openings 116 are provided on the QD box 517 close to each other in the second embodiment, the brightness distribution of light emitted from the light-emitting unit 101, light emitted from the backlight unit, or the like may be improved. Specifically, a brightness distribution where local dimming control or HDR control is performed may be improved.

Figure 18:
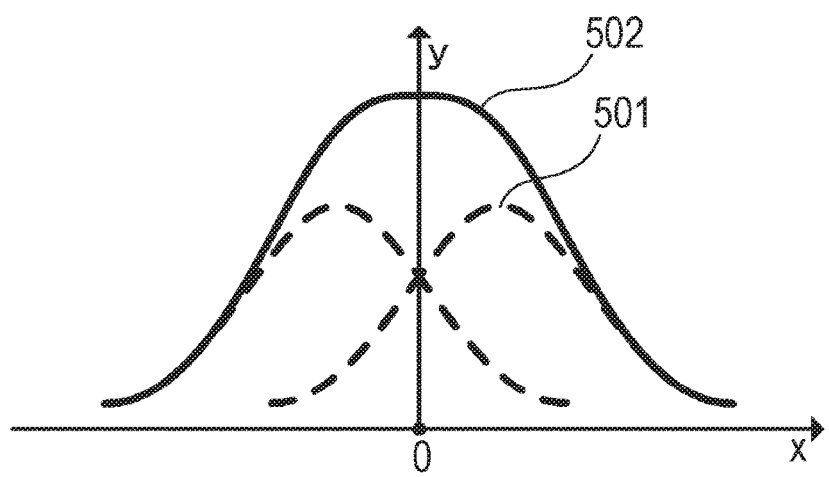
FIG. 18 is a schematic view showing an example of a brightness distribution according to the second embodiment.

FIG. 18 shows an example of the brightness distribution of light emitted from the QD box 517. The brightness distribution of FIG. 18 represents a brightness distribution in a direction parallel to the light-emitting surface. In FIG. 18, a brightness distribution 501 represents the brightness distribution of light emitted from one of the four openings 116, and a brightness distribution 502 represents the brightness distribution of combined light in which four light beams emitted from the four openings 116, respectively, are combined together. In FIG. 18, an x-axis represents a position in the horizontal direction parallel to the light-emitting surface. In the example of FIG. 18, the central position of the opening group (four openings 116) is represented as the zero point of the x-axis. A y-axis represents brightness. The brightness of the y-axis represents the brightness of light emitted from the light-emitting unit 101. The brightness of the y-axis is also called the "brightness of light emitted from the backlight unit," the "brightness of light irradiated onto the back surface of a color liquid-crystal panel 105," or the like.

In the brightness distribution 501 of the light emitted from one opening 116, the brightness of the light becomes maximum at the center of the opening 116 and gradually reduces as the light is separated from the center of the opening 116. The brightness distribution 501 is, for example, a Lambert distribution. Here, for simplification, it is assumed that the brightness distribution 502 represents the brightness distribution of combined light in which two light beams emitted from two openings 116 arranged side by side in the horizontal direction, respectively, are combined together. In this case, as shown in FIG. 18, the sum of the two brightness distributions 501 corresponding to the two openings 116, respectively, arranged side by side in the horizontal direction is obtained as the brightness distribution 502.

Figure 19:
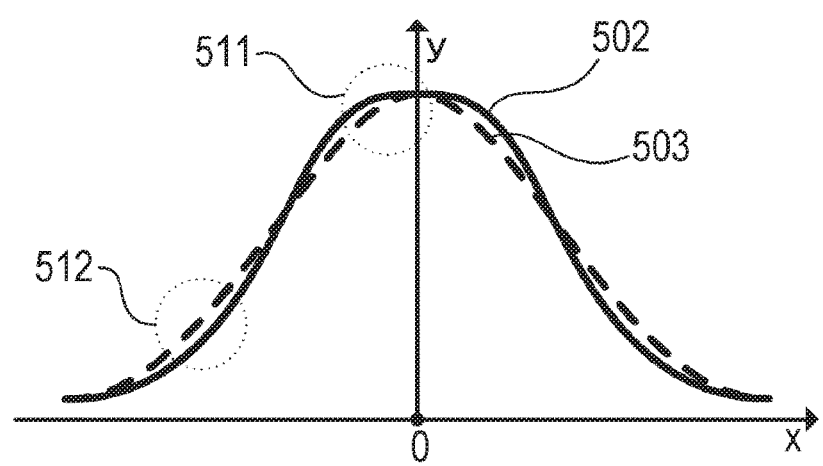
FIG. 19 is a schematic view showing an example of the brightness distribution according to the second embodiment.

FIG. 19 shows examples of the brightness distributions of light beams emitted from the QD boxes 117 and 517. In FIG. 19, a brightness distribution 503 represents the brightness distribution of the light emitted from the QD box 117 (one opening 116) of the first embodiment. The brightness distribution 503 corresponds to the brightness distribution 501 of FIG. 18 and is, for example, a Lambert distribution. As shown in FIG. 19, a brightness change in a peak region 511 including a maximum-brightness position and its peripheral position is gentler in the brightness distribution 502 of the second embodiment than the brightness distribution 503 of the first embodiment. In addition, a brightness change up to the peak region 511 is steeper in the brightness distribution 502 than the brightness distribution 503. For example, a brightness change at a bottom region 512 corresponding to the bottom of the brightness distribution is steeper in the brightness distribution 502 than the brightness distribution 503. The quality of a display image may be improved in such a way that the brightness change in the peak region 511 is broadened and the brightness change up to the peak region 511 is sharpened. Specifically, when the local dimming control or the HDR control is performed, the contrast ratio of a display image may be improved or disturbance feelings due to the halo may be reduced without image processing.

As described above, according to the second embodiment, the plurality of openings 116 are provided on the QD box 517 close to each other. Therefore, the brightness distribution of light emitted from the light-emitting apparatus may be improved, while the occurrence of unintended color irregularities may be reduced.

Note that the number of QD boxes corresponding to one light-emitting block is not particularly limited. For example, a plurality of QD boxes may be classified into a plurality of light-emitting blocks, each of which corresponds to the combination of at least two QD boxes. In this case, at least two light-source units provided in at least the two QD boxes corresponding to the light-emitting blocks, respectively, are driven by the same driving signal. Further, the same effect as the above effect obtained when the plurality of openings 116 are provided in one QD box may be obtained so long as at least two openings 116 of the light-emitting blocks are provided close to each other even if one opening 116 is provided on each of the QD boxes.

Figure 20:
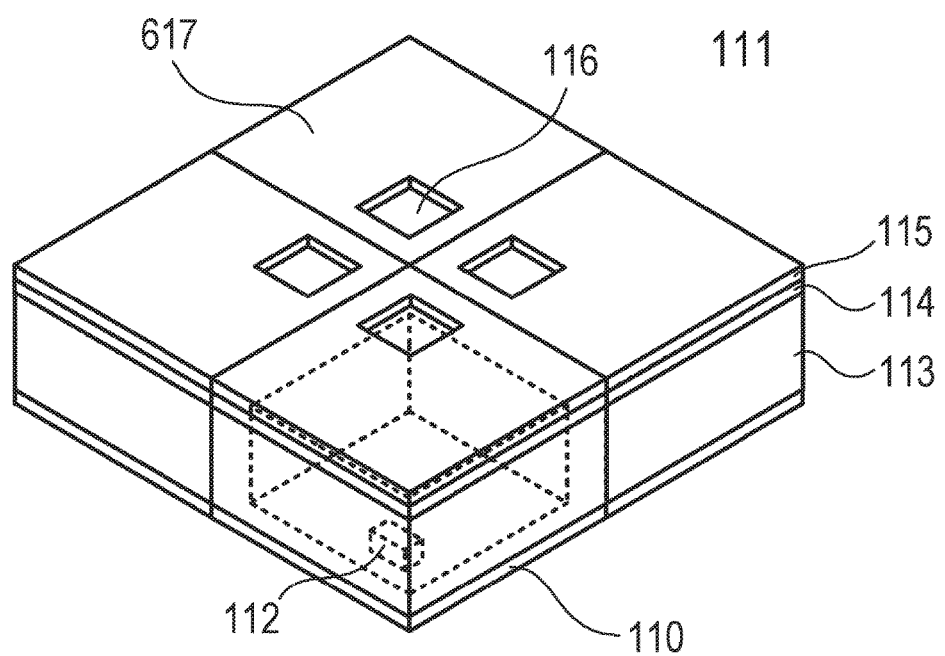
FIG. 20 is a perspective view showing a configuration example of another QD box according to the second embodiment.

FIG. 20 is a perspective view showing a configuration example of a QD box 617. FIG. 20 shows four QD boxes 617 representing one light-emitting block 111. One opening 116 is provided on each of the QD boxes 617. Here, the four openings 116 of the light-emitting block 111 (four QD boxes 617) are provided close to each other. Specifically, the four openings 116 are intensively provided at the center of the light-emitting block 111. Thus, the same effect as the above effect obtained when the plurality of openings 116 are provided on one QD box may be obtained.

Figure 21:
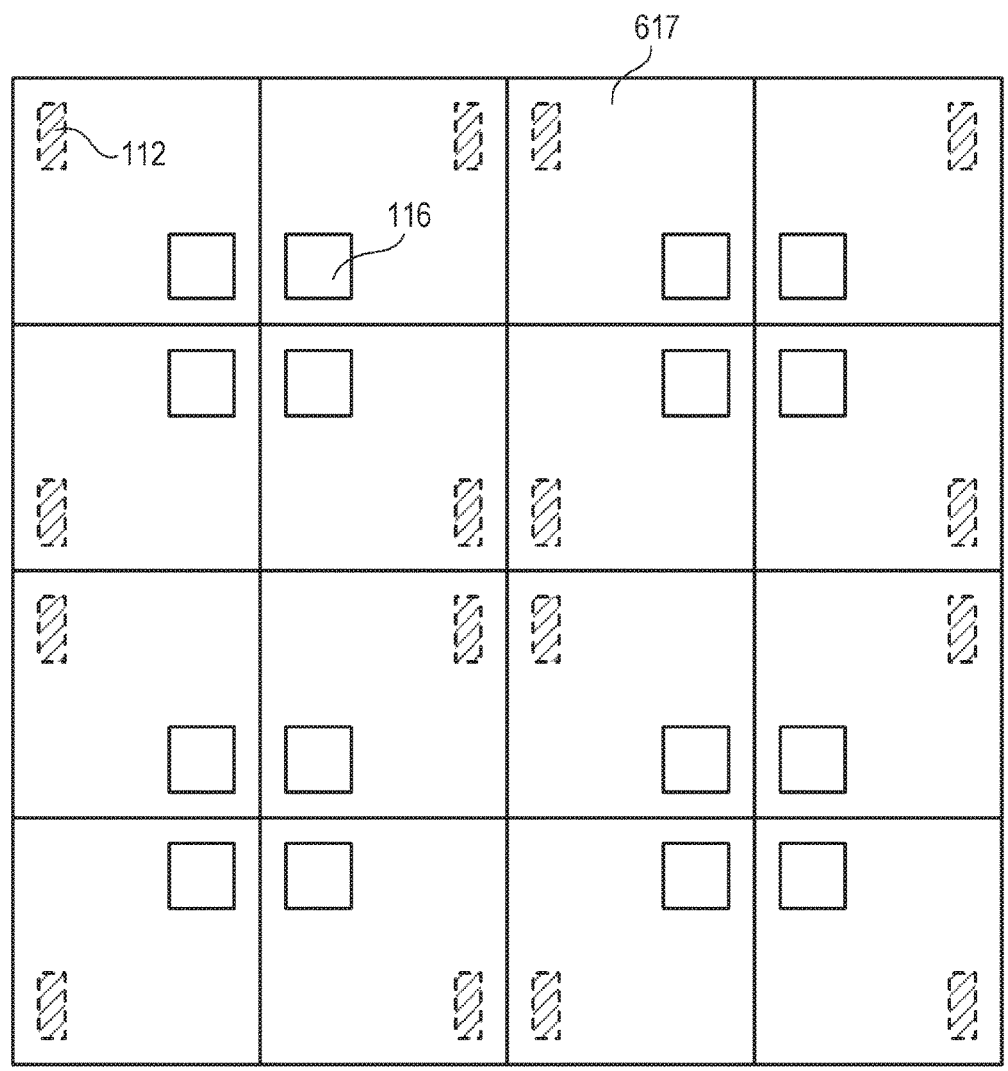
FIG. 21 is a schematic view showing an example of another positional relationship between a light-source unit and an opening according to the second embodiment.

FIG. 21 is a schematic view showing an example of the positional relationship between a light-source unit 112 and an opening 116. FIG. 21 shows the positional relationship in a surface parallel to the light-emitting surface. In the example of FIG. 21, the light-source unit 112 and the opening 116 are provided at one and the other ends in an oblique direction, respectively, in the QD box 617. In addition, the four openings 116 of the light-emitting block 111 (four QD boxes 617) are intensively provided at the center of the light-emitting block 111. Here, the aggregate of the four openings 116 provided on the light-emitting block 111 is described as an "opening group." In the example of FIG. 21, a plurality of opening groups provided on the plurality of light-emitting blocks 111, respectively, are arranged at even intervals. Therefore, when all the light-emitting blocks 111 are lighted up, light having substantially no irregularities may be obtained as light emitted from the light-emitting unit 101, light emitted from the backlight unit, or the like. In addition, a display image having substantially no irregularities may be obtained.

Figure 22A:
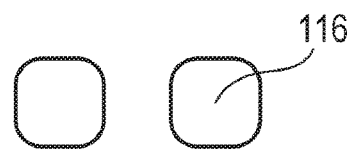
FIGS. 22A to 22D are schematic views each showing an example of another opening according to the second embodiment.
Figure 22B:
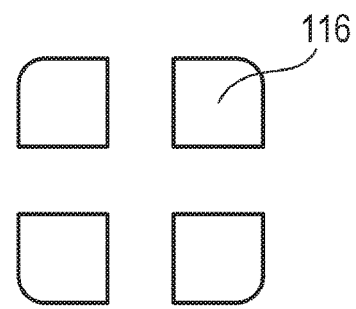
Figure 22C:
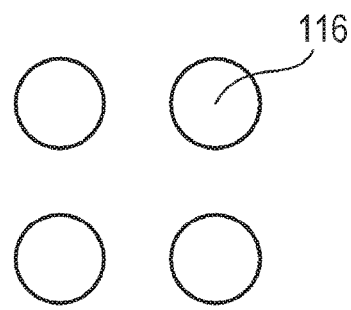
Figure 22D:
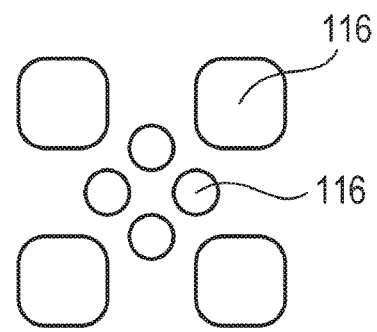

Note that the shape of the openings 116 on the surface parallel to the light-emitting surface is not limited to a quadrilateral shape. For example, as shown in FIGS. 22A and 22B, the shape of the openings 116 may be a quadrilateral shape with at least a part of their corners rounded. FIG. 22A shows the openings 116 with all their four corners rounded, and FIG. 22B shows the openings 116 with one of their corners rounded. The shape of the openings 116 is not limited to a substantially quadrilateral shape. The shape of the openings 116 may be a substantially hexagonal shape, a substantially circular shape, or the like. FIG. 22C shows an example of the openings 116 having a substantially circular shape. As shown in FIG. 22D, the plurality of openings 116 including at least two openings 116 different from each other in at least one of shape and size may be provided as the plurality of openings 116 of the light-emitting block. By the provision of the openings 116 having a rounded shape or at least the two openings 116 different from each other in at least one of shape and size, the brightness distribution of light emitted from the light-emitting apparatus may be improved. The shape, the size, the number, the arrangement, or the like of the openings 116 is so determined that both a brightness distribution where the local dimming control or the HDR control is performed and a brightness distribution where all the light-emitting blocks are lighted up by the same driving signal are improved.

Third Embodiment

Hereinafter, a description will be given of a third embodiment of the present invention. Note that in the third embodiment, points (configurations, processing, or the like) different from those of the first and second embodiments will be described in detail and the same points as those of the first and second embodiments will be omitted. The first and second embodiments describe an example in which the outer shape of a QD box in its surface parallel to a light-emitting surface is a substantially quadrilateral shape. The third embodiment will describe an example in which the outer shape of a QD box in its surface parallel to a light-emitting surface is a substantially hexagonal shape. The outer shape of the QD box in the surface parallel to the light-emitting surface may also be called the "shape of a part, which corresponds to the internal space of the QD box, of the light-emitting surface."

Figure 23:
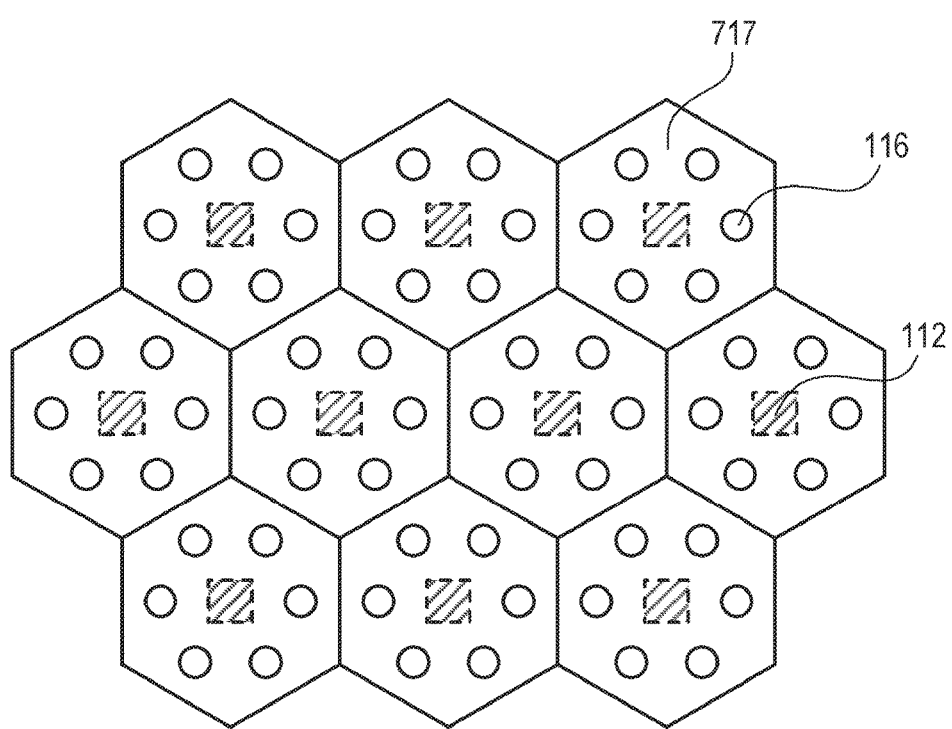
FIG. 23 is a schematic view showing an example of the outer shape of a QD box according to the third embodiment.

FIG. 23 is a schematic view showing an example of the outer shape of QD boxes 717 according to the third embodiment. FIG. 23 shows the outer shape of the QD boxes 711 in their surface parallel to a light-emitting surface. As shown in FIG. 23, the outer shape of the QD boxes 717 is a hexagonal (substantially hexagonal) shape. In each of the QD boxes 717, a light-source unit 112 is provided. In the example of FIG. 23, the light-source unit 112 is provided at substantially the center of the hexagonal shape representing the outer shape of the QD box 717 in its surface parallel to the light-emitting surface. Further, six openings 116 corresponding to the six sides of the hexagonal shape, respectively, are provided on each of the QD boxes 717. The openings 116 corresponding to the sides of the hexagonal shape are openings provided near the sides. Each of the QD boxes 717 is adjacent to six other QD boxes 717. Note that the arrangement of the light-source units 112 is not limited to the arrangement of FIG. 23. In addition, the number and the arrangement of the openings 116 are not limited to those shown in FIG. 23.

Figure 24:
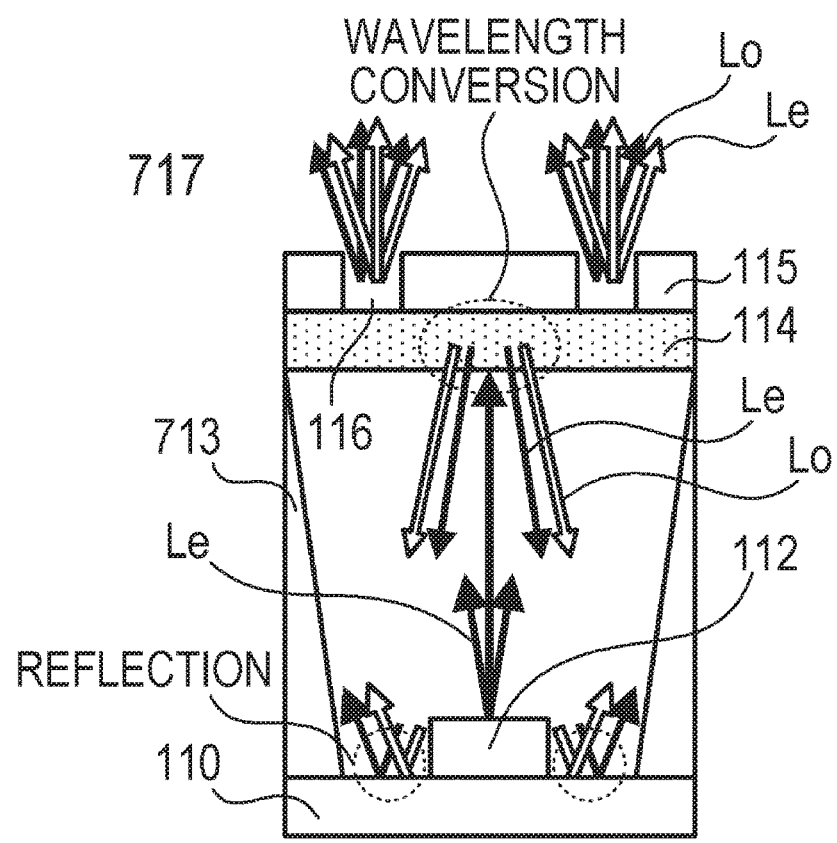
FIG. 24 is a schematic view showing an example of the cross section of the QD box according to the third embodiment.

FIG. 24 shows the cross section of the QD box 717 obtained from a surface perpendicular to the light-emitting surface. Like the first and second embodiments, blue light Le is output to the outside of the QD box 717 via the six openings 116 after being subjected to a sufficient number of reflection and a sufficient number of wavelength conversion. Similarly, red-green light Lo is output to the outside of the QD box 717 via the six openings 116 after being subjected to a sufficient number of reflection. Therefore, like the first and second embodiments, the occurrence of unintended color irregularities may be reduced. As shown in FIG. 23, outer shape of each of the QD boxes 717 is the hexagonal shape. A lattice-shaped reflection member 713 constitutes each of the sides of the hexagonal shape representing the outer shape of the QD box 717. Note that the inner shape of the QD box 717 is not particularly limited. For example, the inner shape of the QD box 717 in its surface parallel to the light-emitting surface may be a substantially circular shape.

Figure 25:
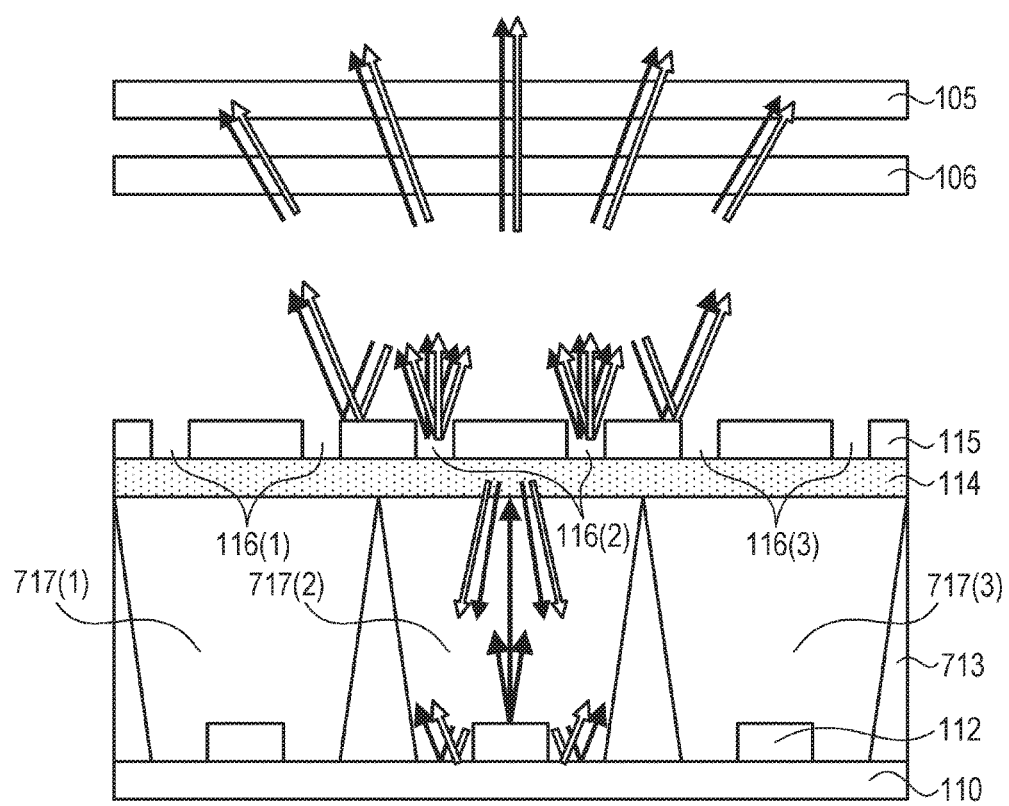
FIG. 25 is a schematic view showing an example of the cross section of the QD box according to the third embodiment.

FIG. 25 shows the cross sections of the QD boxes 717 obtained from a surface perpendicular to the light-emitting surface. FIG. 25 shows an example of a case in which only one of the QD boxes 717 is lighted up by local dimming control or HDR control. FIG. 25 shows three QD boxes 717. In FIG. 25, the x-th QD box 717 is described as a "QD box 717(x)," and the openings 116 of the QD box 717(x) are described as "openings 116(x)." In FIG. 25, only a QD box 717(2) is lighted up.

Inside the QD box 717(2), a sufficient number of reflection and a sufficient number of wavelength conversion are performed. Then, light after being subjected to the sufficient number of reflection and the sufficient number of wavelength conversion is emitted from the QD box 717(2). Therefore, well-balanced white light is emitted from the QD box 717(2). The white light emitted from the QD box 717(2) passes through an optical sheet 106 and a color liquid-crystal panel 105, while being diffused by the reflection of the optical sheet 106, the reflection of a reflection sheet 115, or the like. Here, the white light emitted from the QD box 717(2) is less likely to be returned to a quantum dot sheet 114. Therefore, the white light emitted from the QD box 717(2) passes through the optical sheet 106 and the color liquid-crystal panel 105, while being diffused in a well-balanced state. As a result, light having less color irregularities may be obtained as light emitted from a backlight unit, and a display image having less color irregularities may be obtained.

Figure 26A:
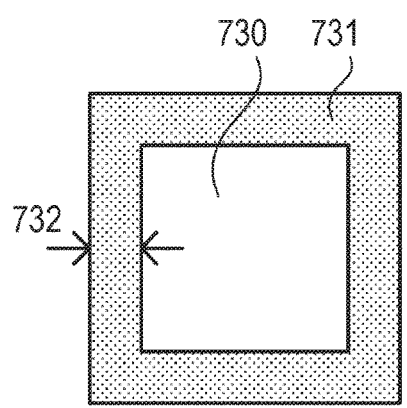
FIGS. 26A and 26B are schematic views showing configuration examples of the QD boxes according to the first to third embodiments.
Figure 26B:
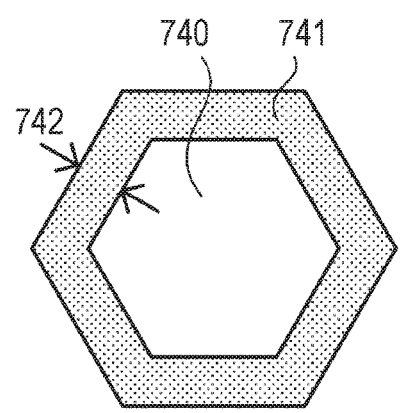

In the third embodiment, it becomes possible to increase the division density of a light-emitting unit 101 by the use of the QD boxes 717 having the hexagonal (hexagonal prism) shape. The division density of the light-emitting unit 101 represents the density of the plurality of QD boxes 717. FIGS. 26A and 26B are schematic views each showing a configuration example of a QD box in its surface parallel to the light-emitting surface. FIG. 26A shows an example of a QD box (first and second embodiments) of which the outer shape is a quadrilateral shape, and FIG. 26B shows an example of a QD box (third embodiment) of which the outer shape is a hexagonal shape.

In FIG. 26A, the shape of an internal space 730 of the QD box is a quadrilateral shape. In FIG. 26B, the shape of an internal space 740 of the QD box is a hexagonal shape. The shape of the internal space 740 is different from that of the internal space 730, but the size (area) of the internal space 740 is the same as that of the internal space 730. The internal space 730 is surrounded by a side-surface portion 731 having thickness 732, and the internal space 740 is surrounded by a side-surface portion 741 having thickness 742. The thickness 742 is the same as the thickness 732.

The outer shape of the side-surface portion 731 is the quadrilateral shape, and the outer shape of the side-surface portion 741 is the hexagonal shape. That is, the outer shape of the side-surface portion 741 is closer to a circular shape than that of the side-surface portion 731. Therefore, a size required for the side-surface portion 741 is smaller than that required for the side-surface portion 731. That is, the size required for the QD box of FIG. 26B is smaller than that required for the QD box of FIG. 26A. The total size of the side-surface portion 741 and the internal space 740 is smaller by about 15% than that of the side-surface portion 731 and the internal space 730. The difference becomes more remarkable when the side-surface portions have large thickness.

As described above, a size required for a QD box may be reduced by the use of the QD box 717 having the hexagonal shape. As a result, the division density of the light-emitting unit 101 may be increased. The increase in the division density allows the local dimming control or the HDR control using a large number of the light-emitting blocks 111 (QD boxes). For example, the local dimming control or the HDR control using at least 1000 light-emitting blocks 111 may be performed. As a result, the contrast ratio of a display image may be significantly increased. In addition, since the strength of a hexagonal wall is high, the thickness 742 of the side-surface portion 741 may be reduced. As a result, a size required for the QD box 717 may be further reduced.

Figure 27:
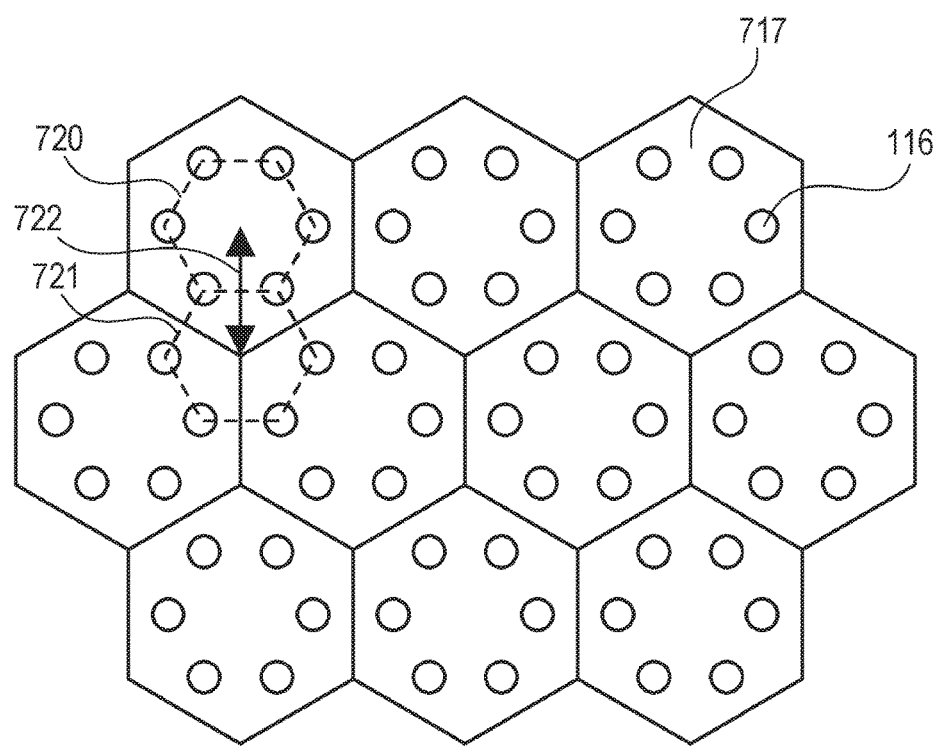
FIG. 27 is a schematic view showing an arrangement example of openings according to the third embodiment.

Next, a description will be given of the arrangement of the openings 116 according to the third embodiment. FIG. 27 is a schematic view showing the arrangement of the openings 116 provided on the QD boxes 717. As described above, in the third embodiment, the six openings 116 corresponding to the six sides of the hexagonal shape, respectively, representing the outer shape of the QD box 717 are provided on each of the QD boxes 717. When the six openings 116 provided on the QD box 717 are connected to each other, a first polygonal shape 720 representing a hexagonal shape is formed. In addition, when the two apexes of the three first polygonal shapes 720 corresponding to the three QD boxes 717, respectively, are connected to each other, a second polygonal shape 721 substantially the same as the first polygonal shape 720 is formed. Further, a repeat pattern in which a plurality of hexagonal shapes (a plurality of the first polygonal shapes 720 and a plurality of the second polygonal shapes 721) are repeated is formed by the plurality of openings 116.

A repeat distance 722 representing the distance between the first polygonal shape 720 and the second polygonal shape 721 adjacent to the first polygonal shape 720 is about half the maximum size of the outer shape of the QD box 717. Here, it is assumed that a distance from the light-emitting unit 101 to the color liquid-crystal panel 105 is described as a "diffusion distance." For example, the diffusion distance is so determined that the irregularities (brightness irregularities, color irregularities, or the like) of light irradiated onto the back surface of the color liquid-crystal panel 105 are sufficiently reduced when all the QD boxes 717 are lighted up. When the repeat distance 722 is short, light emitted from the plurality of QD boxes 717 is sufficiently diffused and averaged to sufficiently reduce the above irregularities even if the diffusion distance is short. Therefore, it becomes possible to reduce the diffusion distance and thus thin a light-emitting apparatus or a display apparatus.

As described above, according to the third embodiment, the outer shape of a QD box in its surfaces parallel to a light-emitting surface is a substantially hexagonal shape. Therefore, the division density of a light-emitting unit may be increased.

Figure 28:
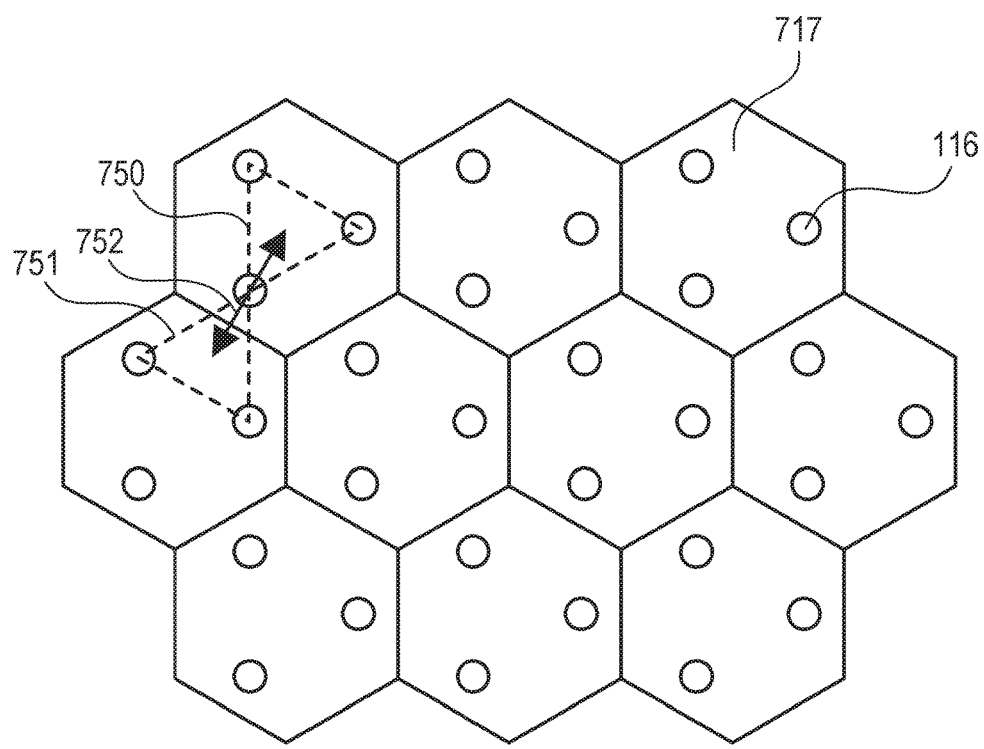
FIG. 28 is a schematic view showing another arrangement example of the openings according to the third embodiment.

Note that the number, the arrangement, the shape, or the like of the openings 116 is not particularly limited as described above. For example, as shown in FIG. 28, three openings 116 corresponding to non-successive three sides, respectively, among the six sides of the hexagonal shape representing the outer shape of the QD box 717 may be provided on each of the QD boxes 717. In FIG. 28, when the three openings 116 provided on the QD box 717 are connected to each other, a first polygonal shape 750 representing a triangular shape is formed. In addition, when one of the apexes of the first polygonal shape 750 and two of the apexes of another first polygonal shape 750 are connected to each other, a second polygonal shape 751 substantially the same as the first polygonal shape 750 is formed. Further, a repeat pattern in which a plurality of triangular shapes (a plurality of the first polygonal shapes 750 and a plurality of the second polygonal shapes 751) are repeated is formed by the plurality of openings 116. In this case, a repeat distance 752 is about 65% of the maximum size of the outer shape of the QD box 717.

Figure 29:
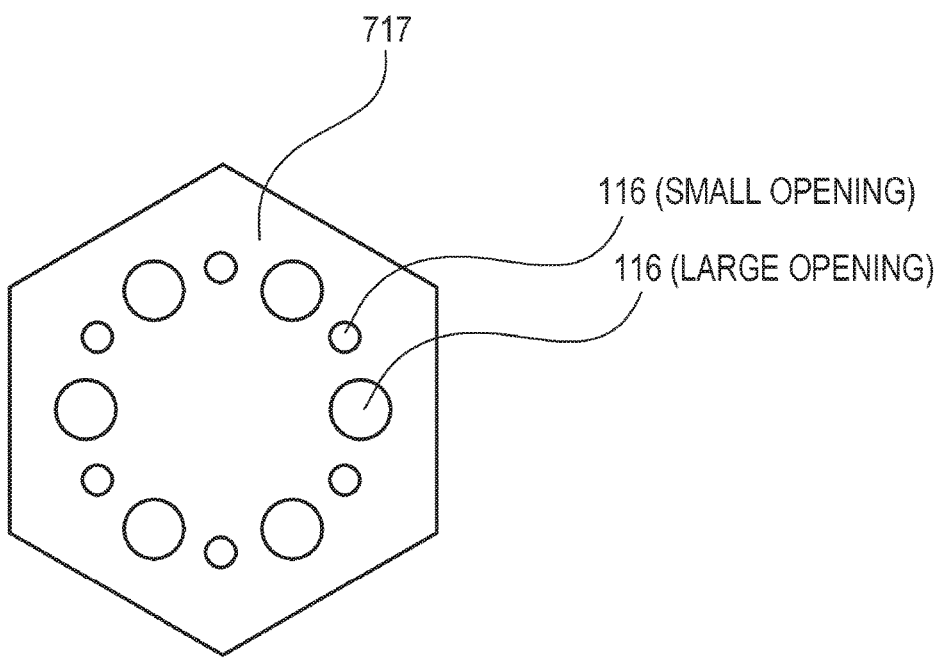
FIG. 29 is a schematic view showing another arrangement example of the openings according to the third embodiment.

In addition, n×N openings 116 (where N is an integer of at least 2) including n openings 116 (where n is three or six) forming a first polygonal shape may be provided on the QD box 717. The n×N openings 116 are substantially uniformly provided with respect to the center of the external upper surface of the QD box 717. In the examples of FIGS. 29 and 30, 12 openings 116 are provided on the QD box 717. The 12 openings 116 include six large openings having a large size and six small openings having a small size. The six large openings form the first polygonal shape 720 of FIG. 27. The small openings are provided between the two large openings adjacent to each other. In other words, the 12 openings 116 are provided so as to draw a circle. With an increase in the number of the openings 116, light may be easily extracted from the QD box 717. In the example of FIG. 30, the shape of the openings 116 is a hexagonal shape. By the provision of the hexagonal openings 116, the density of the plurality of openings 116 may be increased and light may be easily extracted from the QD box 717.

Note that the first to third embodiments are only examples and configurations obtained by appropriately deforming or changing the configurations of the first to third embodiments within the spirit of the present invention are also included in the present invention. Configurations obtained by appropriately combining the configurations of the first to third embodiments together are also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-103323, filed on May 25, 2017, which is hereby incorporated by reference herein in its entirety.

What is claimed is:

1. A light-emitting apparatus comprising:
    a light-source unit configured to emit light of a first color;
    a sheet member containing a conversion member configured to emit light of the first color and light of a second color that is different from the first color, according to incidence of the light emitted from the light-source unit;
    a bottom-surface member;
    a side-surface member; and
    an upper-surface member, wherein
    the sheet member emits the light of the second color by a light amount corresponding to a length of a path where the incident light of the first color passes through the sheet member,
    a space including the light-source unit and the conversion member is formed by the bottom-surface member, the side-surface member, and the upper-surface member, and
    a first opening connecting an inside and an outside of the space to each other is provided at a position, on the upper-surface member, which does not face the light-source unit.

2. The light-emitting apparatus according to claim 1, wherein
    the light-source unit is provided on the bottom-surface member,
    the conversion member is provided along the upper-surface member, and
    the upper-surface member does not have an opening at a position thereof facing the light-source unit in a direction in which intensity is highest in an intensity distribution of the light emitted from the light-source unit.

3. The light-emitting apparatus according to claim 1, wherein
the light-source unit is provided in plurality,
a plurality of spaces each including the light-source unit and the conversion member are formed by the bottom-surface member, the side-surface member, and the upper-surface member, and
each of the plurality of spaces has the first opening on the upper-surface member.

4. The light-emitting apparatus according to claim 1, wherein
the bottom-surface member, the side-surface member, and the upper-surface member reflect the light of the first color and the light of the second color inside the space.

5. The light-emitting apparatus according to claim 2, wherein
a second opening is provided on the conversion member, and
the inside and the outside of the space are connected to each other by the first opening and the second opening without passing through the conversion member.

6. The light-emitting apparatus according to claim 2, wherein
a plurality of spaces each including the light-source unit and the conversion member are formed by the bottom-surface member, the side-surface member, and the upper-surface member,
a plurality of first openings corresponding to the plurality of spaces, respectively, are provided on the upper surface member,
the conversion member is a member shared by the plurality of spaces, and
a part of the conversion member is included in each of the plurality of spaces.

7. The light-emitting apparatus according to claim 1, wherein
a shape of the first opening is a substantially quadrilateral shape, a substantially hexagonal shape, or a substantially circular shape in a surface parallel to a light-emitting surface of the light-emitting apparatus.

8. The light-emitting apparatus according to claim 7, wherein
the shape of the first opening is a polygonal shape with at least a part of corners thereof rounded.

9. The light-emitting apparatus according to claim 1, wherein
a shape of a part, which corresponds to the space, of a light-emitting surface of the light-emitting apparatus is a substantially quadrilateral shape or a substantially hexagonal shape in a surface parallel to the light-emitting surface.

10. The light-emitting apparatus according to claim 1, wherein
the first opening is provided in plurality on the upper-surface member.

11. The light-emitting apparatus according to claim 10, wherein
at least two of the plurality of first openings are different from each other in at least one of shape and size.

12. The light-emitting apparatus according to claim 10, wherein
the plurality of first openings corresponding to the space are provided close to each other, and
in a brightness distribution of combined light, in which a plurality of light beams emitted from the plurality of first openings corresponding to the space, respectively, are combined together, in a direction parallel to a light-emitting surface of the light-emitting apparatus, a brightness change in a peak region including a maximum-brightness position and a peripheral position thereof is gentler and a brightness change up to the peak region is steeper than in a brightness distribution of each of the plurality of light beams.

13. The light-emitting apparatus according to claim 1, wherein
a plurality of spaces each including the light-source unit and the conversion member are formed by the bottom-surface member, the side-surface member, and the upper-surface member,
a plurality of first openings corresponding to the plurality of spaces, respectively, are provided on the upper-surface member,
the plurality of spaces are classified into a plurality of light-emitting blocks, each of which corresponds to a combination of at least two spaces,
light-emitting brightness of at least two light-source units included in the at least two spaces, respectively, is controlled by a same driving signal,
at least two first openings corresponding to the light-emitting blocks are provided close to each other, and
in a brightness distribution of combined light, in which at least two light beams emitted from the at least two first openings, respectively, is combined together, in a direction parallel to a light-emitting surface of the light-emitting apparatus, a brightness change in a peak region including a maximum-brightness position and a peripheral position thereof is gentler and a brightness change up to the peak region is steeper than in a brightness distribution of each of the at least two light beams.

14. The light-emitting apparatus according to claim 1, wherein
a plurality of spaces each including the light-source unit and the conversion member are formed by the bottom-surface member, the side-surface member, and the upper-surface member,
a plurality of first openings are provided on the upper-surface member for each of the plurality of spaces,
a shape of a part, which corresponds to the space, of a light-emitting surface of the light-emitting apparatus is a substantially hexagonal shape in a surface parallel to the light-emitting surface,
the plurality of first openings corresponding to the space include six first openings corresponding to six sides of the substantially hexagonal shape corresponding to the space, respectively,
a first polygonal shape representing a hexagonal shape is formed by connecting the six first openings to each other, and
a second polygonal shape substantially same as the first polygonal shape is formed by connecting two apexes of each of three first polygonal shapes to each other.

15. The light-emitting apparatus according to claim 1, wherein
a plurality of spaces each including the light-source unit and the conversion member are formed by the bottom-surface member, the side-surface member, and the upper-surface member,
a plurality of first openings are provided on the upper-surface member for each of the plurality of spaces,
a shape of a part, which corresponds to the space, of a light-emitting surface of the light-emitting apparatus is a substantially hexagonal shape in a surface parallel to the light-emitting surface, the plurality of first openings corresponding to the space include three first openings corresponding to three non-successive sides, respectively, among six sides of the substantially hexagonal shape corresponding to the space, a first polygonal shape representing a triangular shape is formed by connecting the three first openings to each other, and a second polygonal shape substantially same as the first polygonal shape is formed by connecting one apex of the first polygonal shape and two apexes of another first polygonal shape to each other.

16. The light-emitting apparatus according to claim 14, wherein the plurality of first openings corresponding to the space include n (where n is three or six) first openings forming the first polygonal shape and are n×N (where N is an integer of at least 2) first openings substantially uniformly provided with respect to a center of a part, which corresponds to the space, of the light-emitting surface.

17. A display apparatus comprising:

a backlight unit including a light-source unit configured to emit light of a first color, a sheet member containing a conversion member configured to emit light of the first color and light of a second color that is different from the first color, according to incidence of the light emitted from the light-source unit, a bottom-surface member, a side-surface member, and an upper-surface member; and a display panel configured to display an image by transmitting the light of the first color and the light of the second color emitted from the backlight unit on the basis of input image data, wherein the sheet member emits the light of the second color by a light amount corresponding to a length of a path where the incident light of the first color passes through the sheet member, a space including the light-source unit and the conversion member is formed by the bottom-surface member, the side-surface member, and the upper-surface member, and a first opening connecting an inside and an outside of the space to each other is provided at a position, on the upper-surface member, which does not face the light-source unit.

18. The display apparatus according to claim 17, wherein the light-source unit is provided on the bottom-surface member, the conversion member is provided along the upper-surface member, and the upper-surface member does not have an opening at a position thereof facing the light-source unit in a direction in which intensity is highest in an intensity distribution of the light emitted from the light-source unit.

19. The display apparatus according to claim 17, wherein in the backlight unit, a plurality of spaces each including the light-source unit and the conversion member are formed, and a plurality of first openings corresponding to the plurality of spaces, respectively, are provided, and the display apparatus comprises a control unit controlling light-emitting brightness of each of the plurality of light-source units included in the plurality of spaces, respectively, on the basis of the input image data.

* * * * *